United States Patent
Ryoo et al.

(10) Patent No.: US 9,697,949 B2
(45) Date of Patent: Jul. 4, 2017

(54) TRANSFORMER AND HIGH VOLTAGE POWER SUPPLY APPARATUS HAVING THE SAME

(71) Applicant: KOREA ELECTROTECHNOLOGY RESEARCH INSTITUTE, Changwon-si, Kyongsangnam-do (KR)

(72) Inventors: Hong Je Ryoo, Changwon-si (KR); Sung Roc Jang, Daegu (KR); Hyoungsuk Kim, Changwon-si (KR); Jong Soo Kim, Changwon-si (KR)

(73) Assignee: KOREA ELECTROTECHNOLOGY RESEARCH INSTITUTE, Changwon-si, Kyongsangnam-Do (KR)

( * ) Notice: Subject to any disclaimer, the term of this patent is extended or adjusted under 35 U.S.C. 154(b) by 151 days.

(21) Appl. No.: 14/528,040

(22) Filed: Oct. 30, 2014

(65) Prior Publication Data

US 2015/0117064 A1    Apr. 30, 2015

(30) Foreign Application Priority Data

Oct. 30, 2013  (KR) .................. 10-2013-0129682
Sep. 12, 2014  (KR) .................. 10-2014-0120652

(51) Int. Cl.
*H01F 27/32* (2006.01)
*H01F 27/28* (2006.01)
(Continued)

(52) U.S. Cl.
CPC ..... *H01F 27/2895* (2013.01); *H01F 27/2823* (2013.01); *H01F 27/325* (2013.01);
(Continued)

(58) Field of Classification Search
CPC .... H01F 27/2895; H01F 38/42; H01F 27/325; H01F 27/2823; H01F 2005/022; H02M 3/3353; H02M 2001/0077
(Continued)

(56) References Cited

U.S. PATENT DOCUMENTS 4,862,130 A * 8/1989 Ellison ............ H01F 5/02
336/185
5,585,773 A * 12/1996 Murata ........... H01F 38/12
336/107
(Continued)

FOREIGN PATENT DOCUMENTS

DE       214580 C      10/1909
EP    1122875 A2       8/2001
(Continued)

OTHER PUBLICATIONS

Search report EIC 2800 STIC searcher Benjamin Martin.*
(Continued)

*Primary Examiner* — Jue Zhang
*Assistant Examiner* — Htet Z Kyaw
(74) *Attorney, Agent, or Firm* — Hauptman Ham, LLP

(57) ABSTRACT

A transformer including first coil unit and second unit, wherein one or more coils are wound on the bobbin of insulating material in at least one of the first coil unit and the second unit, and wherein the bobbin is formed with at least one partitioning flange for partitioning a coil winding surface of the bobbin into two winding surfaces along the longitudinal direction of the bobbin, is disclosed.

13 Claims, 19 Drawing Sheets

(51) Int. Cl.
*H01F 38/42* (2006.01)
*H02M 3/335* (2006.01)
*H01F 5/02* (2006.01)
*H02M 1/00* (2006.01)

(52) U.S. Cl.
CPC .......... *H01F 38/42* (2013.01); *H02M 3/3353* (2013.01); *H01F 2005/022* (2013.01); *H02M 2001/0077* (2013.01)

(58) Field of Classification Search
USPC ........... 363/17; 336/198, 196, 192, 206–208, 336/210, 170, 173
See application file for complete search history.

(56) References Cited

U.S. PATENT DOCUMENTS

| | | | |
|---|---|---|---|
| 6,107,790 A | | 8/2000 | Sawazaki et al. |
| 7,733,208 B2* | | 6/2010 | Wolfgram ............. H01F 27/325 336/207 |
| 2001/0019491 A1* | | 9/2001 | Yasumura ........... H02M 3/3385 363/21.12 |
| 2007/0241853 A1* | | 10/2007 | Yang .................... H01F 27/325 336/208 |
| 2008/0024261 A1* | | 1/2008 | Shinmen ............... H01F 27/326 336/208 |

FOREIGN PATENT DOCUMENTS

| | | |
|---|---|---|
| JP | 56-26925 U | 3/1981 |
| JP | S5626925 U | 3/1981 |
| JP | 58-49406 U | 4/1989 |
| JP | 61-158937 U | 10/1989 |
| JP | 01-321608 A | 12/1989 |
| JP | 05-267065 A | 10/1993 |
| JP | H05-267065 A | 10/1993 |
| JP | 07-029752 A | 1/1995 |
| JP | 2001-218466 A | 8/2001 |

OTHER PUBLICATIONS

Translated document JP H0526065 A Pub. Date.:Oct. 15, 1993.*
Translated document DE214580 Pub. Date: Oct. 5, 1909.*
Translated document JP 58-49406 Pub. Date: Apr. 4, 1989.*
Japanese Office Action for application No. 2014-222050 dated Sep. 8, 2015.
European Search Report for application No. 14190934.1-1556 dated Mar. 9, 2015.

* cited by examiner

TRANSFORMER AND HIGH VOLTAGE POWER SUPPLY APPARATUS HAVING THE SAME

CROSS REFERENCE TO RELATED APPLICATION

This application claims the priority of Korean Patent Application No. 10-2013-0129682, filed on Oct. 30, 2013 and No. 10-2014-0120652, filed on Sep. 12, 2014 in the KIPO (Korean Intellectual Property Office), which is incorporated herein by reference in its entirety.

BACKGROUND OF THE INVENTION

1. Technical Field

The present invention relates to a transformer, more particularly to a high voltage transformer and a high voltage power supply apparatus having the same.

2. Description of the Related Art

A transformer is an apparatus for changing voltage value or current value of AC (Alternating Current) by using electromagnetic phenomenon.

In case that the voltage is raised by using the transformer, particularly a DC/DC converter, the transformer may be saturated by the operating frequency and the voltage applied to the first coils.

The saturation of the transformer is a phenomenon that if the magnetic flux density is over the specific value, the magnetic flux density rarely increase despite the increase of the magnetizing force although the magnetic flux density generally increases when the magnetizing force increase. And the saturation phenomenon induces a harmonic frequency which shortens the durability of the transformer or cause vibration of the transformer. In addition, the saturated transformer loses the function as a transformer; thereby the required second voltage cannot be obtained.

One method to prevent this saturation phenomenon is to increase magnetizing inductance by increasing the turns of the first coil of the transformer. But when magnetizing inductance is increased, the turns of the second coil of the transformer should be increased corresponding to the turns of the first coil in order to maintain the same raising ratio of voltage.

After all, in order to prevent this saturation phenomenon together with the stable output, the minimum turns of the first coil for preventing saturation together with the ratio of the turns of the first coil and the second coil for maintaining the same raising ratio, and the insulation between the first coil and the second coil and the insulation between the layers in the second coil corresponding to the turns of the first coil, should be considered together.

FIG. 14 shows a structure of the prior transformer designed by the above method.

The transformer in FIG. 14, is provided with a core 110, first coil unit wound in the core 110 (not shown because first coil unit wound in the core 110 is wound within the bobbin), a bobbin 130 of insulating material such as Teflon, and second coil unit 140 wound on the bobbin 130. And the transformer is connected with the supporting unit by the connecting member such as bolt 170, and a bus bar 150 may be provided around the transformer.

FIG. 15 shows a side view of the prior transformer of FIG. 14.

The prior transformer generally uses a method in which the winding area is increased by increasing the length of the core in winding coil on the bobbin 130 for the second coil unit 140. That is to say, since the turns of the first coil unit is increased in order to prevent saturation of the transformer, and the turns of the second coil unit 140 is increased in proportional with the increase of the turns of the first coil unit, the size of the core should be increased in order to provide increased space for the increased turns of the second coil unit. But this method has a problem that the volume of the transformer and the manufacturing cost increase.

Generally, when the higher raising ratio in the transformer is required, more turns of the second coil than the turns of the first coil unit in the bobbin. In addition, in case that the turns of the first coil unit increase in order to prevent saturation of the transformer, the turns of the second coil unit also increase. Therefore, the coil of the second coil unit should be wound in two or more layers in the bobbin in case that it is impossible to wind coil of the second coil unit in one layer.

FIG. 16A shows the prior method for winding coil of the second coil on the bobbin in the transformer considering the layer insulation, and FIG. 16B shows a circuit diagram in a state of coil winding on the bobbin of the prior transformer.

But since the insulation between the layers in the second coil unit should be considered, the region enabling the winding of the coils of the second coil unit on the bobbin in the higher layer continuously decreases as shown in FIG. 16B.

According to the prior method for winding coil of the second coil in the prior transformer, coil is wound around the bobbin 130 from one end of the bobbin 130 in a direction of the arrow numbered 1. After reaching the other end of the bobbin 130 by being wound in the direction of the arrow numbered 1, the coil in the next layer is wound from the other end of the bobbin 130 in the direction of the arrow numbered 2.

And when reaching the one end of the bobbin 130 by being wound in the direction of the arrow numbered 2 in the next layer, the coil in the next layer will contact the first end of the coil in the first layer, and there is a great difference in voltage between the end of the coil in the next layer the direction of the arrow numbered 2 and the first end of the coil in the first layer.

Therefore, in order to maintain the insulation between layers in the first coil unit, the coil should be wound by remaining 'A' portion as in FIGS. 16A and 16B empty in the direction of the arrow numbered 3.

By repeating these processes, when reaching the one end of the bobbin 130 by being wound in the direction of the arrow numbered 3, the coil is again wound by remaining 'B' portion as in FIGS. 16A and 16B empty in the direction of the arrow numbered 4 considering the layers insulation.

But when the coil in the second coil unit is wound on the bobbin 130 by this method, the longitudinal center of the high voltage transformer has a convex shape, which results in increase in volume of the transformer and makes maintenance of a proper distance from the second coil unit of the adjacent transformer impossible.

In addition, there is a problem that the turns in the second coil unit are limited when the height of the coil layers becomes higher, and then efficiency falls.

In particular, when the second coil unit wound in the core of EE shape or UU shape, the distance between the second coils wound on both sides decreases, thereby insulation destruction phenomenon may occur.

DISCLOSURE OF THE INVENTION

Therefore, an object of the present invention is to provide a transformer and a high voltage power supply apparatus capable of more winding in the coil unit and layer insulation.

To achieve these and other advantages and in accordance with the purpose of the present invention, as embodied and broadly described herein, there is provided a core; a first coil unit wound on the core; a bobbin enclosing the first coil unit; and a second coil unit wound on the bobbin, wherein the bobbin includes one or more partitioning flanges for dividing the winding surface on which each second coil is wound, and second coil is wound on both sides of the bobbin based on the partitioning flange.

An insulating member enclosing a part of the core may be installed, and the first coil may be wound on the insulating member.

The core may have a rectangular shaped core which is formed with a hole within in order to be wound by coils, and the first coil may be wound on one side of the four sides of the rectangular shaped core.

An opening may be formed in the one or more partitioning flanges, the second coil may pass through the opening and be wound on both sides of the bobbin based on the partitioning flange and partitioned by the partitioning flange.

The end of the coil wound on both sides of the bobbin may be connected with one end of another coil wound on both sides of the bobbin based on another partitioning flange formed with an opening over another partitioning flange adjacent to the partitioning flange formed with the opening.

Another object of the present invention is to provide a high voltage power supply apparatus which includes an inverter for converting DC voltage to AC voltage; one or more transformers for converting first AC voltage converted by the inverter to second AC voltage different from the first AC voltage; and a rectifying unit for rectifying the second AC voltage converted by the one or more transformer to DC voltage, wherein the transformer includes a core; a first coil unit wound on the core; a bobbin of insulating material enclosing the first coil unit; and a second coil unit wound on the bobbin, wherein the bobbin includes one or more partitioning flanges for dividing the winding surface on which each second coil is wound, and second coil is wound on both sides of the bobbin based on the partitioning flange.

The inverter may be connected with a plurality of the transformers respectively having a rectangular ring shaped core, and the one side wound by the first coil unit and the second coil unit in each rectangular ring shaped cores of each transformer may be opposite to each other between the adjacent transformers and the first coil unit and the second coil unit may cross the first coil unit and the second coil unit of the adjacent transformer.

The transformer and the rectifying unit may be installed in a case and impregnated in insulating material filled in the case, and the first coil of the transformer may be connected with a coil of the inverter by a first connector installed to the case.

The first connector may include, a conductive member for connecting the terminals respectively formed in the inner coil and the outer coil, the conductive member inserted through a mounting hole formed in the case; a first insulation member installed between the case and the conductive member, the first insulation member insulating the case from the conductive member; a fixing member for fixing the conductive member to the mounting hole of the case; a sealing member installed between the case and the conductive member, the sealing member sealing the gap between the case and the conductive member; a first connecting member for fixing the terminal outside of the case to the conductive member; and a second connecting member for fixing the terminal inside of the case to the conductive member.

The first insulation member may have a cylinder shape, and be installed between the inner circumferential surface of the mounting hole of the case and the outer circumferential surface of the conductive member.

The conductive member may include, a body unit inserted through the mounting hole of the case and positioned through the inside and the outside of the case, and a hooking portion having a flange shape in one end of the body unit, the fixing member may be connected with the body unit opposite to the hooking portion based on the mounting hole of the case, and the hooking portion and the fixing member may fix the conductive member by pressurizing the both surfaces of the case.

The fixing member may have a nut shape, and be screw-connected to the outer circumferential surface of the conductive member.

The insulating sealing member may be inserted between the hooking portion of the conductive member and the case.

An insulating member may be inserted between the fixing member and the case.

The conductive member may include a large diameter portion inserted through the mounting hole of the case, and a small diameter portion connected with the terminal outside of the case, and the first connecting member may have a nut shape and screw-connected with the small diameter portion by pressurizing the terminal connected with the small diameter portion together with the large diameter portion.

The second connecting member may have a bolt shape so as to be connected with the conductive member, and pressure and fix the terminal inside of the case to the conductive member in a state of being connected with the conductive member.

The transformer and the rectifying unit may be installed in a case and impregnated in insulating material filled in the case, and the output cable of high voltage connected with the rectifying unit within the case may be connected with a cable outside of the case via a second connector installed at the case.

The second connector may include a connector body having a flange unit fixed to the case and a connecting unit inserted through a mounting hole formed at the case; a first conductive unit connected with the end of the inner cable being inserted through and penetrating the connector body to the inside of the connector body; a connector cap coupled with the connecting unit of the connector body inserted through the mounting hole; and a second conductive unit connected with the end of the outer cable being inserted through and penetrating the connector cap to the inside of the connector cap, the connector body being connected with the first conductive unit when the connector cap connected with the connecting unit of the connector body.

A sealing member may be pressurized and inserted between the flange unit and the case.

Another object of the present invention is to provide a transformer comprising first coil unit and second unit, wherein one or more coils are wound on the bobbin of insulating material in at least one of the first coil unit and the second unit, and wherein the bobbin is formed with at least one partitioning flange for partitioning a coil winding surface of the bobbin into two winding surfaces along the longitudinal direction of the bobbin.

At least a part of the partitioning flanges may be formed with an opening through which a coil passes in the longitudinal direction of the bobbin, and the coil may include at least one subcoils which is inserted through the opening formed in the partitioning flange, wound in at least one layer on the winding surface of the bobbin, and the both ends may be respectively and electrically connected with the adjacent subcoils.

The bobbin may be formed with at least one first partitioning flange formed with an opening through which a coil passes in the longitudinal direction of the bobbin, and at least one second partitioning flange not having any opening through which a coil passes in the longitudinal direction of the bobbin, the first partitioning flange and the second partitioning flange being arranged in alternating order, and the coil may include at least one subcoils which is inserted through the opening of the first partitioning flange, wound in at least one layer on a first and second winding surfaces partitioned by the partitioning flange, and the both ends may be respectively and electrically connected with the adjacent subcoils.

The second winding surface partitioned by the first partitioning flange may be partitioned from the first winding surface by the adjacent second partitioning flange, and one end of the subcoil wound on the second winding surface may be electrically connected with the end of the subcoil wound on the adjacent first winding surface partitioned by second partitioning flange over the outer end of the second partitioning flange.

The wound subcoil may be lower than the outer ends of the first and the second partitioning flanges.

The transformer may comprise a core wound by the first coil unit and the second coil unit.

The core may have a rectangular ring shape, and the first coil unit is wound on one side of the rectangular ring shaped core.

The bobbin may enclose the first coil unit, and the second coil unit may be wound on the bobbin.

The first coil unit may be wound in a cylinder shape without a core in which magnetic flux flows.

Another object of the present invention is to provide a high voltage power supply apparatus comprising: an inverter for converting DC voltage to AC voltage; one or more transformer for converting first AC voltage converted by the inverter to second AC voltage different from the first AC voltage; and a rectifying unit for rectifying the second AC voltage converted by the one or more transformer to DC voltage.

A plurality of the transformers may respectively have a rectangular ring shaped core, the bobbin may enclose the first coil unit, and the second coil unit is wound on the bobbin, the plurality of the transformers may be arranged in parallel with each other in a direction perpendicular with the ring of the core, and the side in the rectangular ring wound by the first coil unit in one transformer may be opposite to the side in the rectangular ring wound by the first coil unit in the adjacent transformer.

A plurality of the transformers may respectively have a rectangular ring shaped core, the bobbin may enclose the first coil unit, and the second coil unit may be wound on the bobbin, the plurality of the transformers may be arranged in parallel with each other in a direction perpendicular with the ring of the core, and the cores of the plurality of the transformers may be slanted with the arranging direction of the cores.

The wound subcoil may be lower than the outer ends of the first and the second partitioning flanges.

The high voltage power supply apparatus may comprises a core wound by the first coil unit and the second coil unit.

The bobbin may enclose the first coil unit, and the second coil unit may be wound on the bobbin.

The first coil unit may be wound in a cylinder shape without a core in which magnetic flux flows.

The transformer and the high voltage power supply apparatus in accordance with the present invention have the following advantages.

First, there is an effect in that more turns in the second coil unit may be available because the layer insulation in the second coil unit of the transformer is unnecessary compared with the prior transformer having the conventional winding method.

Second, it is possible that the insulation between the adjacent second coils is available.

Third, there is an effect in that the confidence of the surface discharge between the first coil unit and the second coil unit may be available.

Fourth, there is an effect in that in the system having a plurality of transformers, a proper distance for insulation between the second coils units and a compact arrangement may be available, and a space may be reduced.

MODES FOR CARRYING OUT THE PREFERRED EMBODIMENTS

Hereinafter, preferred embodiments of the present invention will be explained in more detail with reference to the attached drawings.

Figure 1:
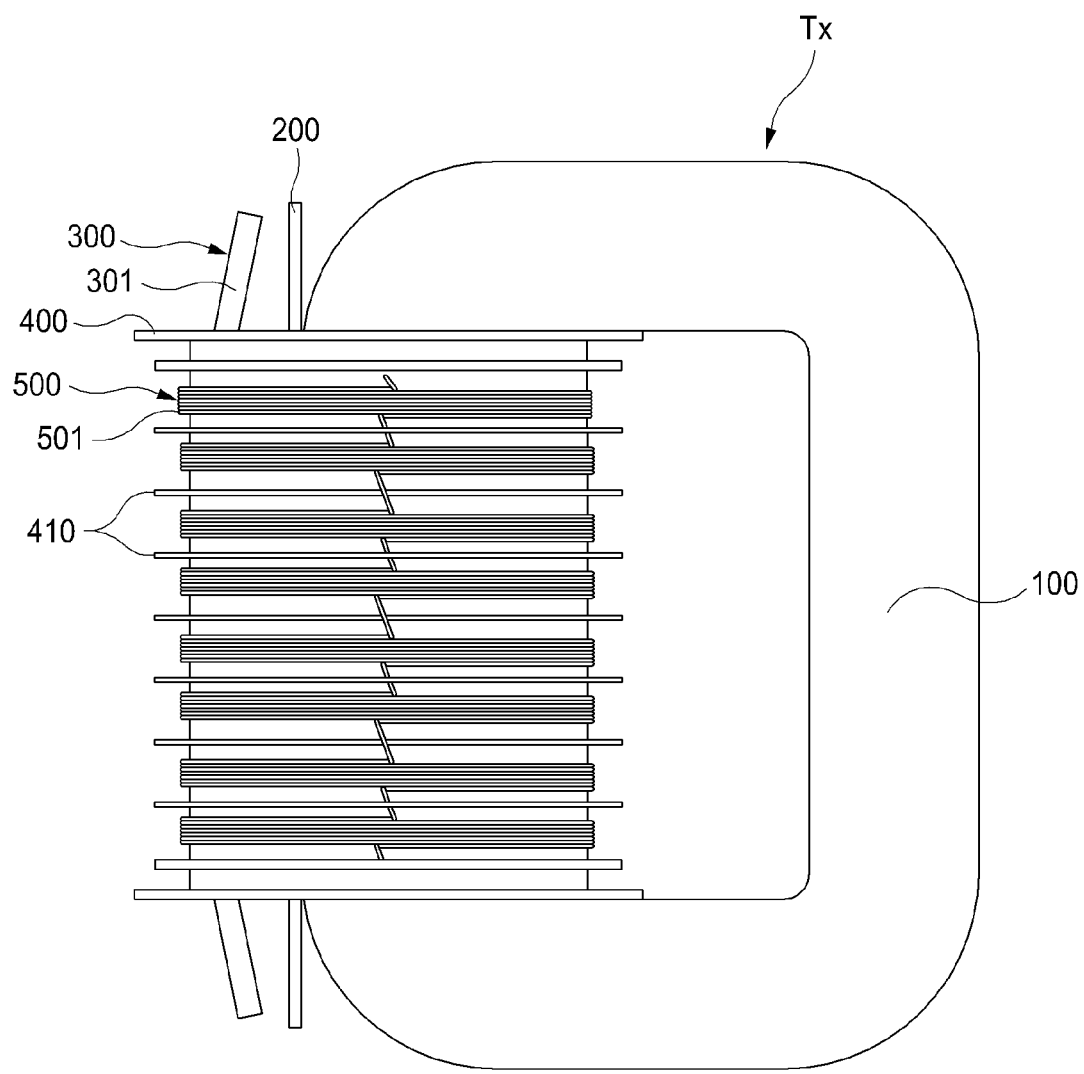
FIG. 1 is a side view showing the transformer in accordance with the embodiment of the present invention.
Figure 2:
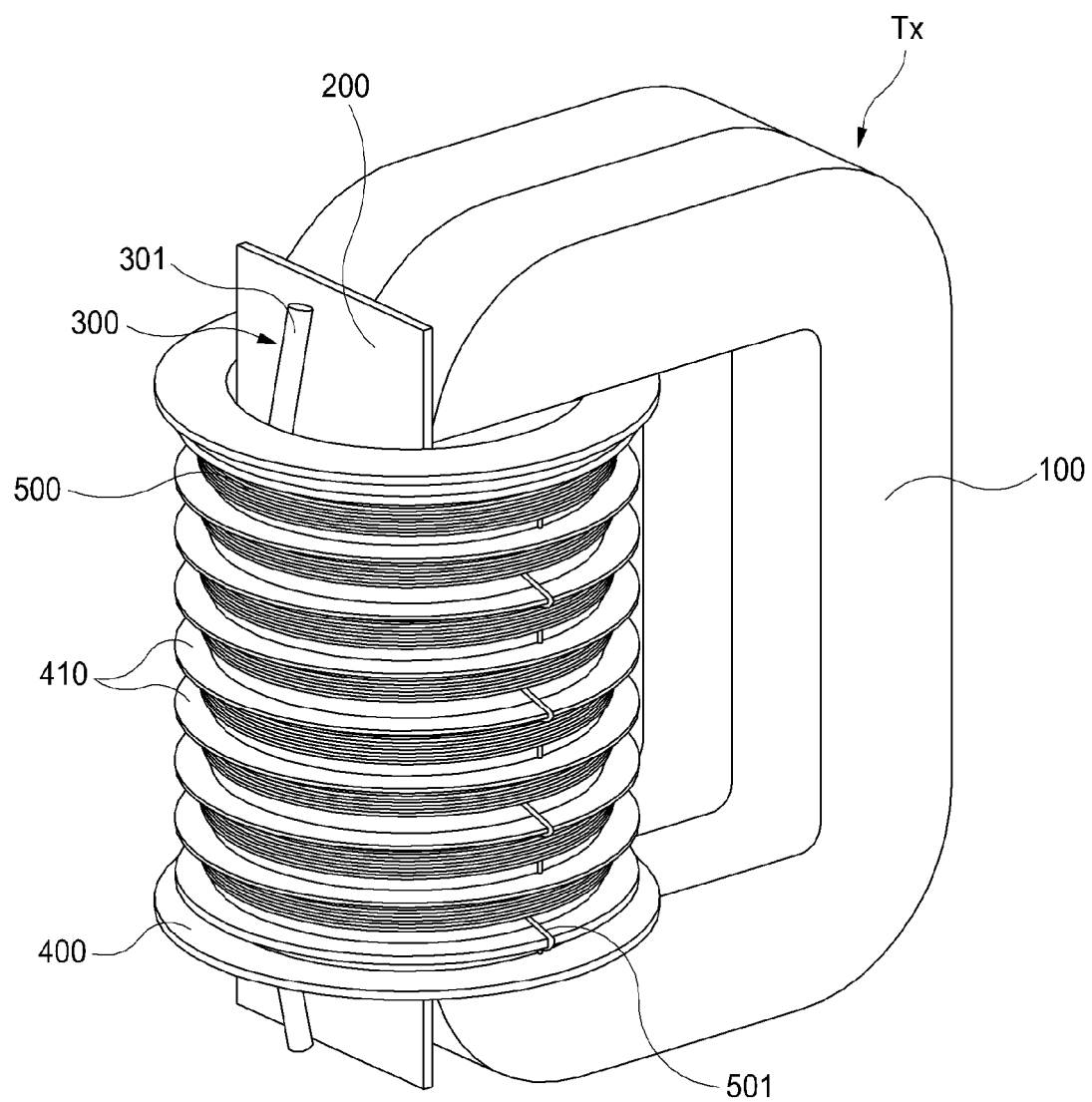
FIG. 2 is a perspective view showing the transformer in accordance with the embodiment of the present invention.

FIG. 1 is a side view showing the transformer in accordance with the embodiment of the present invention, and FIG. 2 is a perspective view showing the transformer in accordance with the embodiment of the present invention.

The transformer in accordance with the embodiment of the present invention may include a core 100, an insulating body 200, first coil unit 300, bobbin 400 and a second coil unit 500.

The core 100 of the transformer Tx in accordance with the embodiment of the present invention may have a rectangular shape, and a hole may be formed within the core. And iron core or ferrite may be selected as the material of this core 100, but not limited to this; any other material in which magnetic flux may smoothly flow may be used as an alternative.

The first coil 300 may be wound on only one side of the four sides of the rectangular shaped core 100 in the transformer Tx in accordance with the embodiment of the present invention. The longer side than that of the other side may be selected as the side wound by the first coil 300. And an insulating body 200 may enclose the outer surface of the core 100 before the first coil unit 300 is wound on the core 100 in order to maintain the insulation between the core 100 and the first coil unit 300.

In the transformer Tx in accordance with the embodiment of the present invention, the first coil 300 is wound on the core 100, but an air core structure which the first coil 300 is wound without any core in a cylinder shape may be used.

In the transformer Tx in accordance with the embodiment of the present invention, the bobbin 400 may enclose the first coil unit 300 after the first coil unit 300 is wound on the core 100. The bobbin 400 in accordance with the embodiment of the present invention may use a material having good insulating characteristic such as Teflon in order to insulate first coil unit 300 and second coil unit 500

The bobbin 400 in accordance with the embodiment of the present invention may be formed with one or more partitioning flanges 410. The partitioning flange 410 may be perpendicular to the winding surface 430 of the bobbin 400. And a second coil unit 500 may be wound on the respective divided winding surfaces 430 of the bobbin 400 based on this partitioning flange 410.

In addition, the second coil unit 500 may be wound on the respective divided winding surfaces 430 of the bobbin 400 in one layer, but the second coil unit 500 may be wound in multiple layers on each winding surface of the bobbin 400 in order to make turns of the second coil unit 500 increase more.

Figure 16A:
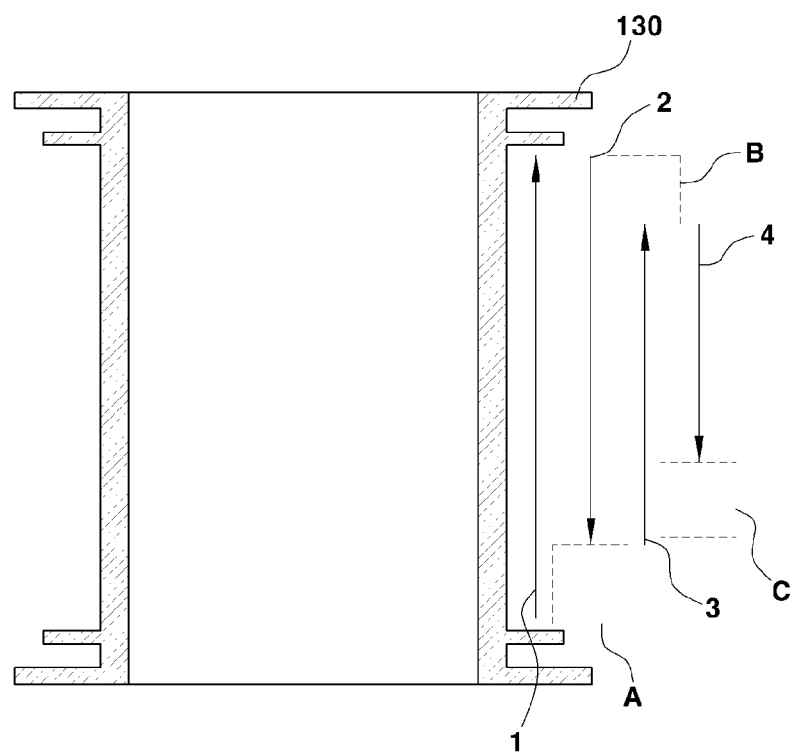
FIG. 16A shows the prior method for winding coil of the second coil on the bobbin in the transformer considering the layer insulation.
Figure 16B:
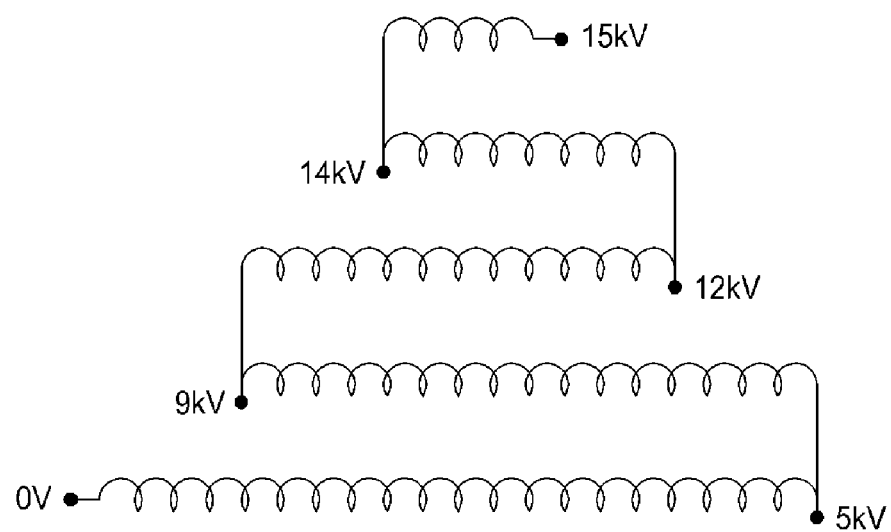
FIG. 16B shows a circuit diagram in a state of coil winding on the bobbin of the prior transformer.

Compared with the prior transformer, much more turns of coil in the second coil unit 500 may be wound on the bobbin 400 particularly when wound in multiple layers without any consideration on the layer insulation of the second coil unit 500 in the transformer Tx in accordance with the embodiment of the present invention manufactured by the above method. That is to say, since no empty space such as 'A', 'B', 'C' portion as in FIG. 16A of the prior transformer is necessary when wound in multiple layers, much more turns of the coil in the second coil unit 500 may be available. In addition, together with this, the confidence in the insulation between the layers in the second coil unit 500, and the confidence of the surface discharge between the first coil unit 300 and the second coil unit 400 may be available.

In addition to the example that the second coil unit 500 is wound on the bobbin having the partitioning flange 410, the bobbin (not shown) wound by the first coil unit 300 may also be have one or more partitioning flange 410 as described in the above, or all the bobbins respectively wound by the first coil unit 300 and the second coil unit 500.

In detail, coil 301, 501 may be wound on the bobbin 400 of insulating material having the above structure in at least one of the first coil unit 300 and the second coil unit 500.

As shown in FIGS. 1 and 2, in the bobbin 400 having the partitioning flange 410, the one or more partitioning flange 410 may be formed in the longitudinal direction of the bobbin 400 and the one or more partitioning flange 410 may partition the winding surface wound by the coil in two or more. For example, one or more first partitioning flange 411 and one or more second partitioning flange 412 may be alternatively formed with each other.

Hereinafter, the manufacturing process of the transformer in accordance with the embodiment of the present invention will be explained in detail.

Figure 3A:
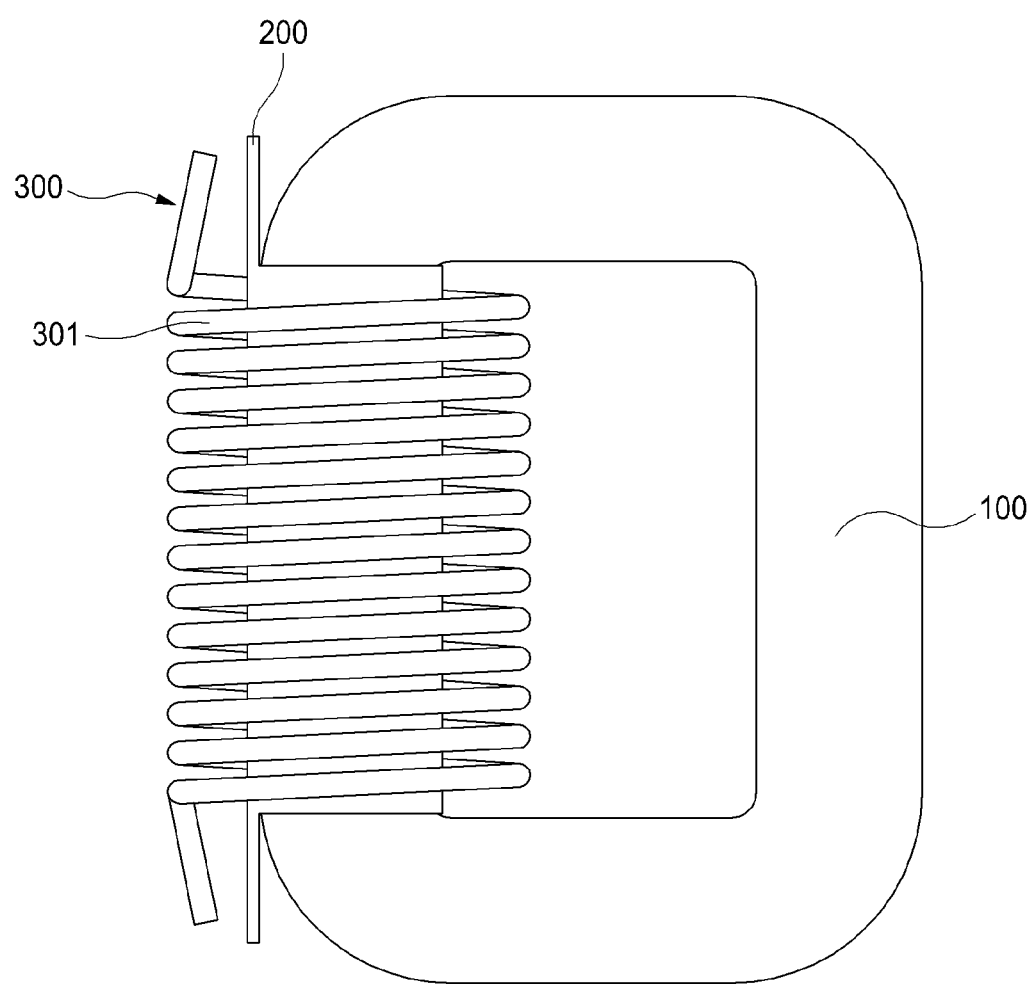
FIG. 3A shows a view in which a first coil unit is wound on the core of the transformer in accordance with the embodiment of the present invention.
Figure 3B:
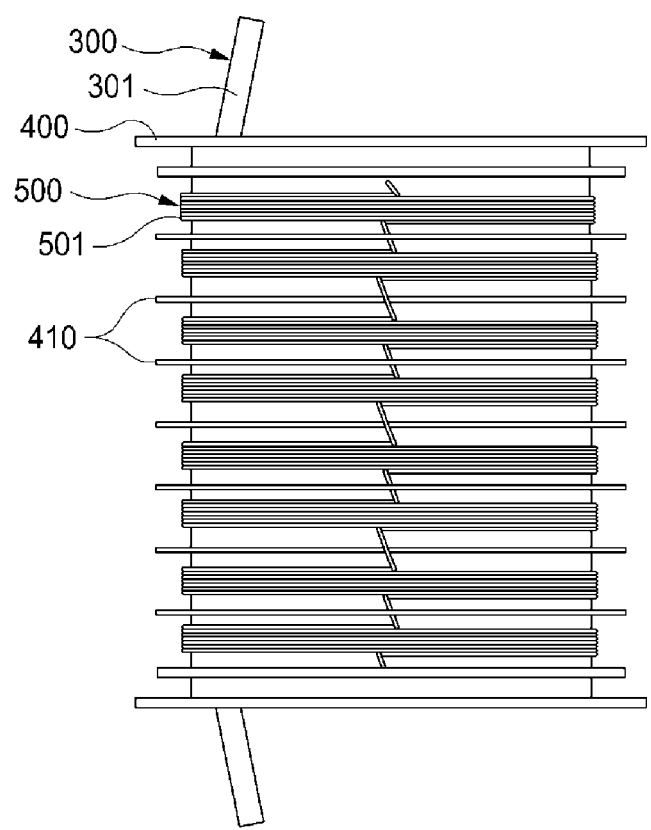
FIG. 3B shows a view that a core is not installed in the modified transformer in FIG. 1.

FIG. 3A shows a view in which a first coil unit is wound on the core of the transformer in accordance with the embodiment of the present invention.

Generally, when a rectangular shaped core used, the first coil unit is wound on one side of the rectangular shaped core and the second coil unit is wound on the opposite side of the rectangular shaped core.

But in the transformer in accordance with the embodiment of the present invention, the second coil unit 500 may be wound over the first coil unit 300 after the first coil unit 300 is wound on the one side of the rectangular shaped core 100. In the transformer in accordance with the embodiment of the present invention, an insulating body 200 encloses the one side of the rectangular shaped core 100, and then the first coil unit 300 is wound on the insulating body 200. And after the bobbin 400 encloses the first coil unit 300, the second coil unit 500 may be wound on the winding surface 430 of the bobbin 400.

Figure 4:
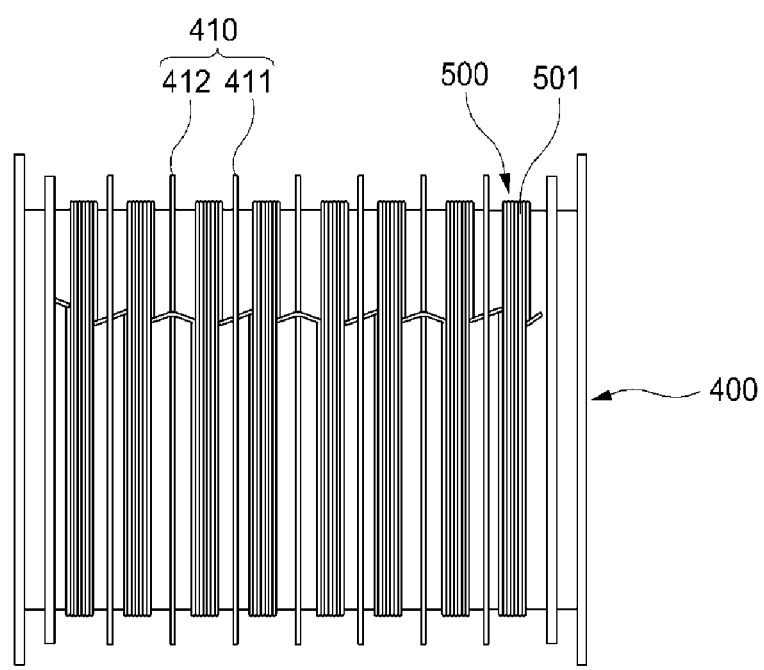
FIG. 4 shows a view in which a second coil unit is wound on the bobbin of the transformer in accordance with the embodiment of the present invention.

FIG. 4 shows a view in which a second coil unit is wound on the bobbin of the transformer in accordance with the embodiment of the present invention.

Figure 5:
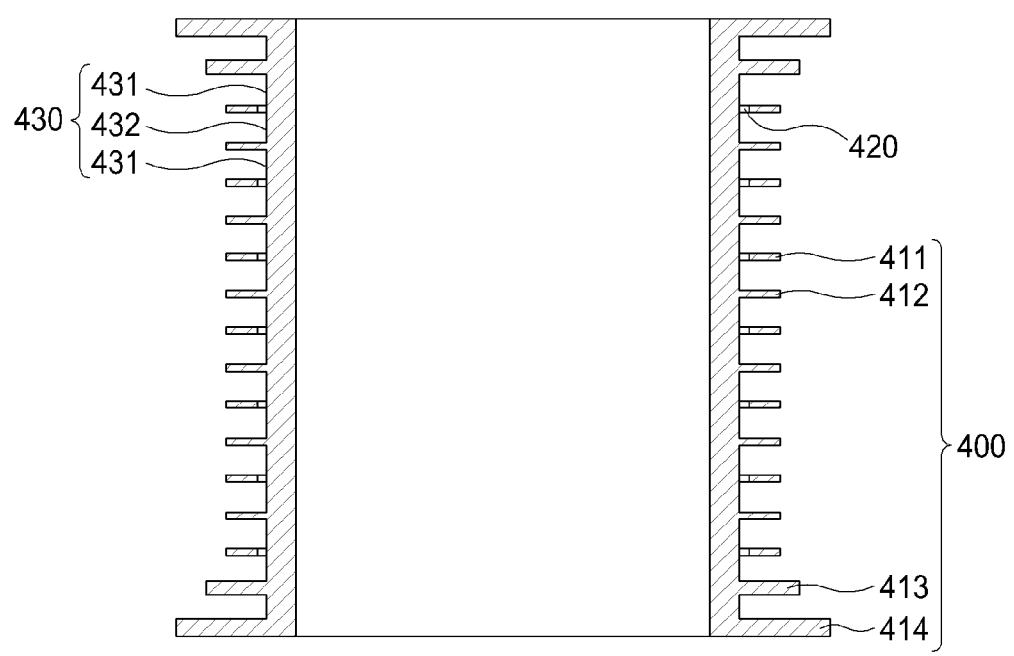
FIG. 5 shows a sectional view of the transformer in accordance with the embodiment of the present invention.

In the bobbin 400 of the transformer in accordance with the embodiment of the present invention, the respective winding surfaces 431, 432 wound by the second coil unit 500 may be divided by the partitioning flange 410. And the second coil unit 500 may be wound between the partitioning flange 410 and the partitioning flange 410, in other words, on the winding surfaces 430 between the adjacent partitioning flanges 410. As shown in FIG. 5, an opening 420 may be formed in at least one partitioning flange 410.

In detail, the winding method for the second coil unit 500 on the bobbin 400 in the transformer in accordance with the embodiment of the present invention is as follows.

First, first coil 501 of the second coil unit 500 may be inserted thorough the opening 420 formed in the partitioning flange 410. The first coil 501 of the second coil unit 500 inserted through the opening 420 may be wound on the winding surfaces 410 divided by the partitioning flange 410 formed with the opening 420. And the first coil 501 of the second coil unit 500 may be inserted thorough the opening 420 formed in each partitioning flange 410, and wound on the winding surfaces 410 divided by the partitioning flange 410 formed with the opening 420.

In particular, at least one of the pluralities of partitioning flanges 410 may be formed with the opening 420 around the winding surface 410 in the longitudinal direction of the bobbin 400, through which the first coil 501 of the second coil unit 500 is inserted.

In more detail, one or more first partitioning flanges 411 formed with the opening 420 through which the first coil 501 of the second coil unit 500 is inserted and one or more second partitioning flanges 412 without such opening 420 may be formed and alternatively arranged in the longitudinal direction of the bobbin 400. Here, the one or more second partitioning flanges 412 also may be formed with the opening 420 but the first coil 501 of the second coil unit 500 is not inserted through the opening 420.

Referring to winding method in a pair of second coil units 500 in the most left, the first coil 501 of the second coil unit 500 is inserted through the opening 420 of the partitioning flange 410, i.e. first partitioning flange 411 and then wound on both winding surfaces 430 based on the partitioning flange 410 formed with the opening 420, i.e. first partitioning flange 411. After finishing the winding of the first coil 501, the end of the first coil 501 of the second coil unit 500 is positioned over the next partitioning flange 410, i.e. second partitioning flange 412. And the end of the first coil 501 of the second coil unit 500 positioned over the next partitioning flange 410 is electrically connected with the end of the end of the first coil 501 of another adjacent second coil 500 positioned over the partitioning flange 410 by the same method. Here, the two first coils 501 are electrically connected over the partitioning flange 410 which is not formed with the opening 420. This electrical connection between the two first coils 501may be performed by soldering or a connector which will be described hereinafter.

In detail, as shown in FIGS. 4 and 5, the first coil 401 may include at least one subcoils which is inserted through the opening 420 of the first partitioning flange 411, wound in at least one layer on a first and second winding surfaces 431, 432 partitioned by the partitioning flange 410, and the both ends may be respectively and electrically connected with the adjacent subcoils.

Here, the plurality of first partitioning flanges 411 may be provided with and the plurality of subcoils may be provided with corresponding to the number of the first partitioning flanges 411 for being electrically connected with the adjacent subcoil after wound on the first and second winding surfaces 431, 432.

FIG. 5 shows a sectional view of the transformer in accordance with the embodiment of the present invention.

One or more partitioning flanges 410 may be provided with in the bobbin 400 of the transformer in accordance with the embodiment of the present invention so that the subcoils are respectively wound on the respective winding surfaces 430 partitioned by the partitioning flanges 410. And the height of this partitioning flange 410 from the winding surface 430 may be sufficiently large value. And the heights of the outer partitioning flanges 413, 414 may be larger than that of the partitioning flange 410 in order to insulate the first coil unit 300 and the second coil unit 500.

The partitioning flange 410 of the bobbin 400 may be formed with one or more partitioning flanges 410. The opening 420 may be formed in the second partitioning flange 410 from the partitioning flange 410 formed with the opening 420 in an alternative manner And the second coil 401 of the second coil unit 500 may be wound through the opening 420 of the partitioning flange 410 on the bobbin 400. In other words, the partitioning flanges 410 may be arranged as the first partitioning flange 411 formed with the opening 420 and the second partitioning flange 412 may be alternatively arranged in a longitudinal direction of the bobbin 400.

Figure 6A:
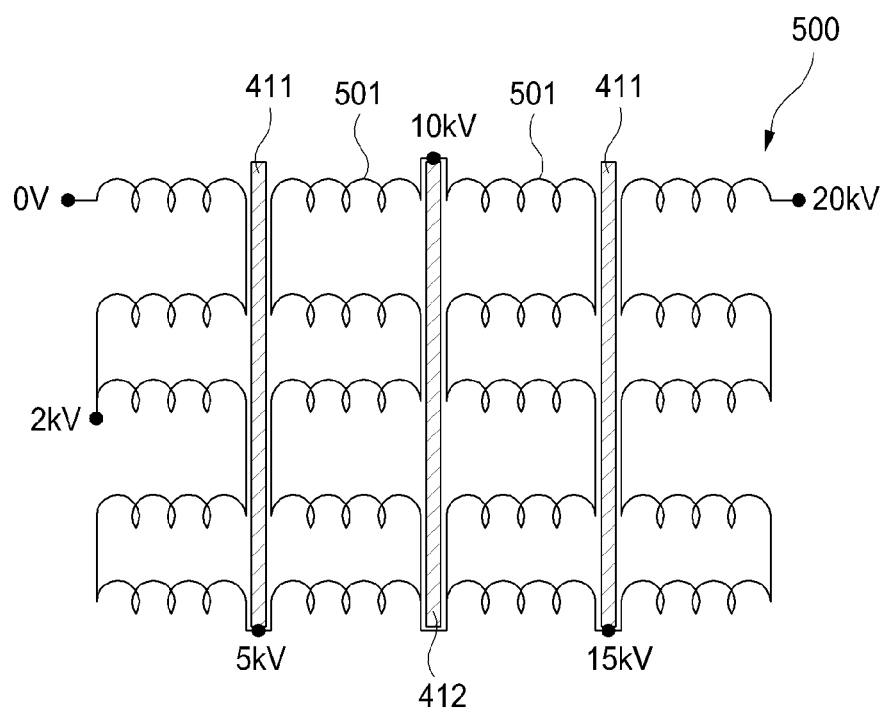
FIG. 6A shows a circuit diagram of the second coil unit.
Figure 6B:
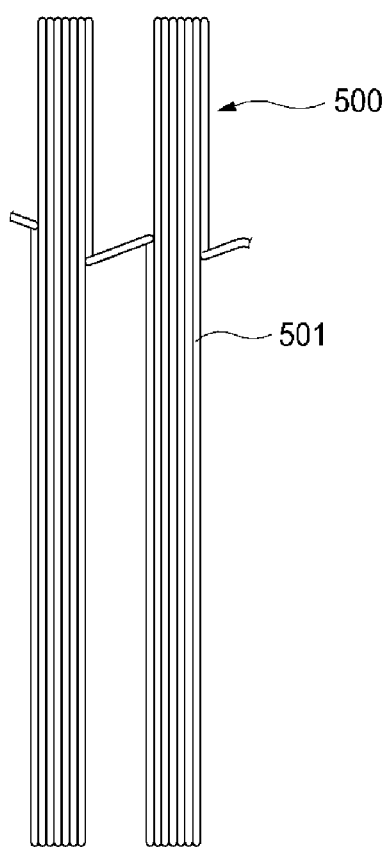
FIG. 6B shows a winding shape of the second coil unit without the bobbin.

When the second coil unit 500 is wound on the winding surface 430 of the bobbin 400 formed with the partitioning flange 410 in this manner, the voltage differences in the second coil unit 500 as shown in FIG. 6B may be lessened. That is to say, when the second coil 501 is wound, the wound second coil 501 in the next layer should have a certain distance from the wound second coil 501 in the lower layer considering insulation in the prior high voltage transformer.

As shown in FIG. 6A, in the transformer in accordance with the embodiment of the present invention, instead of being wound on the whole winding surface in a plurality of layers, a pair of windings based on the partitioning flange 410 does not make empty space for insulation because the consideration of the voltage difference in the windings between the adjacent the partitioning flanges 410. In addition, there is no voltage difference from the adjacent second coil unit 500. In the space between the partitioning flanges 410, the second coil unit 500 may be wound in multiple layers, and there is little voltage difference between the coils even when the second coil unit 500 is wound in multiple layers at the space between the partitioning flanges 410 of the bobbin 400.

FIG. 6B shows a winding shape of the second coil unit without the bobbin.

In the center of FIG. 6B, the portion connecting the second coils 501 is the portion passing through the opening 420 formed in the partitioning flange 410 of the bobbin 400. And, both ends of the second coil 501 centering the center connecting portion may pass over the partitioning flange 410 of the bobbin 400 for being connected with the other second coil 501.

For example, the plurality of second coils 501 is continuously arranged, the second coils 501 at both sides of the partitioning flange 410 are one which is physically connected with each other through the opening 420, but the connection to the other second coil 501 passing through the opening 420 of the adjacent partitioning flange 410 may be performed by soldering, a connector, etc.

In other words, as showing in FIGS. 4 and 5, the second winding surface 432 partitioned by the first partitioning flange 411 is partitioned from the first winding surface 432 by the adjacent second partitioning flange 412, one end of the subcoil wound on the second winding surface 432 is electrically connected with the end of the subcoil wound on the adjacent first winding surface 431 partitioned by the second partitioning flange 412 over the outer end of the second partitioning flange 412.

Here the wound subcoil may preferably be lower than the outer ends of the first and the second partitioning flanges 411, 412.

The winding method in the transformer in accordance with the embodiment of the present invention, may give more turns of the second coil unit than the prior transformer and good insulation of the wound second coil unit 500 may be available.

Figure 7:
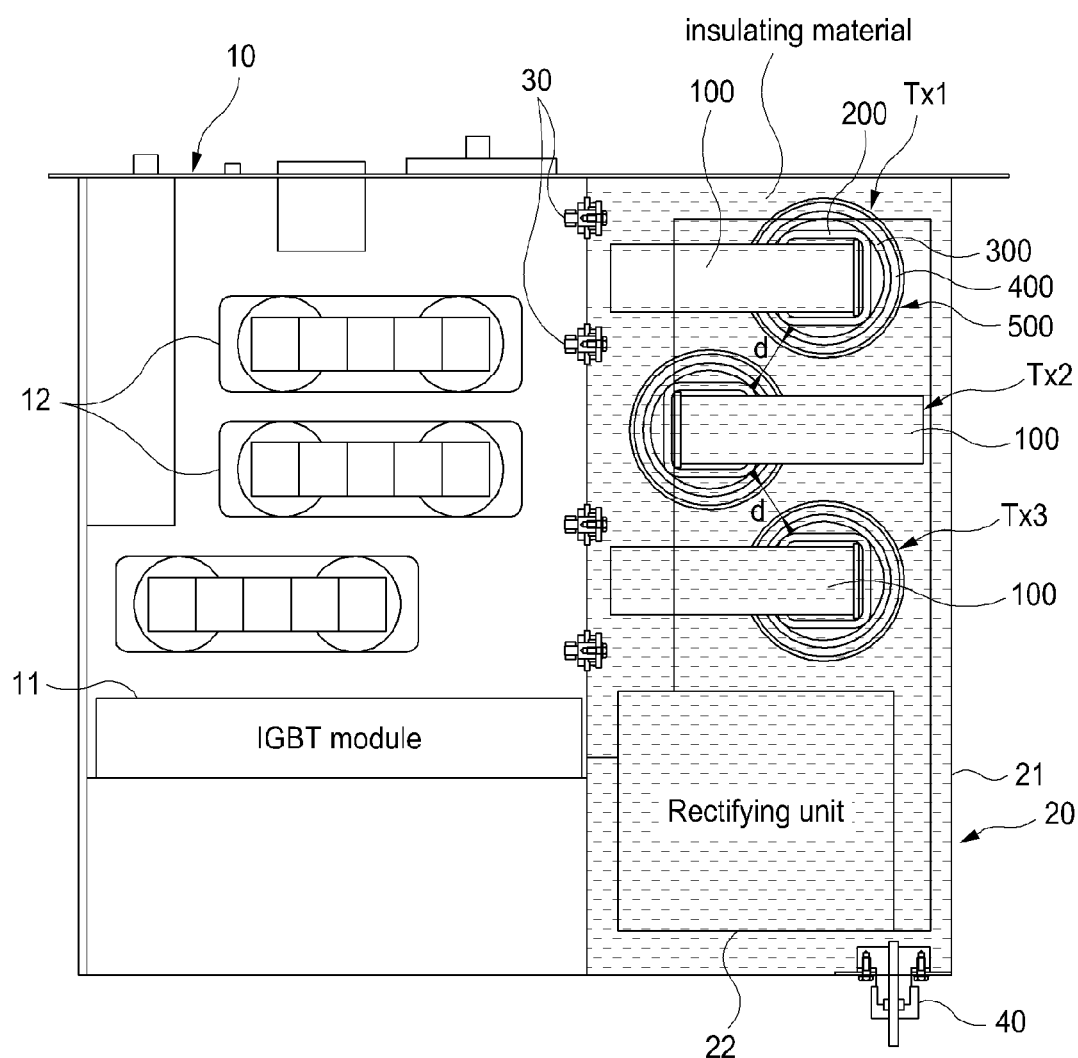
FIG. 7 shows a view in which the transformer in accordance with the embodiment of the present invention is mounted in the circuit viewed from the above.

FIG. 7 shows a view in which the transformer in accordance with the embodiment of the present invention is mounted in the circuit viewed from the above.

The circuit in the Drawings, uses three transformers Tx1~Tx3. And in the transformers Tx1~Tx3, the first coil units 300 and the second coil units 500 crosses with each other. The first coil unit 300 and the second coil unit 500 are alternatively arranged so that the one side of the rectangular shaped core 100 wound by the first coil unit 300 and the second coil unit 500 does not overlap with the one side of the adjacent transformers Tx1~Tx3. Since the portion of the rectangular shaped core wound by coil is positioned opposite to the other one of the transformers Tx1~Tx3, a sufficient insulation distance between the coils of the adjacent transformers Tx1~Tx3 may be available. Therefore, the apparatus having a plurality of transformers Tx1~Tx3 may have a smaller overall volume and size, and a compact structure may be available.

The circuit in FIG. 7 shows the arrangement of the transformers as shown in the Drawings may provide a sufficient insulation distance between the second coil units 500 and a compact arrangement.

Figure 8:
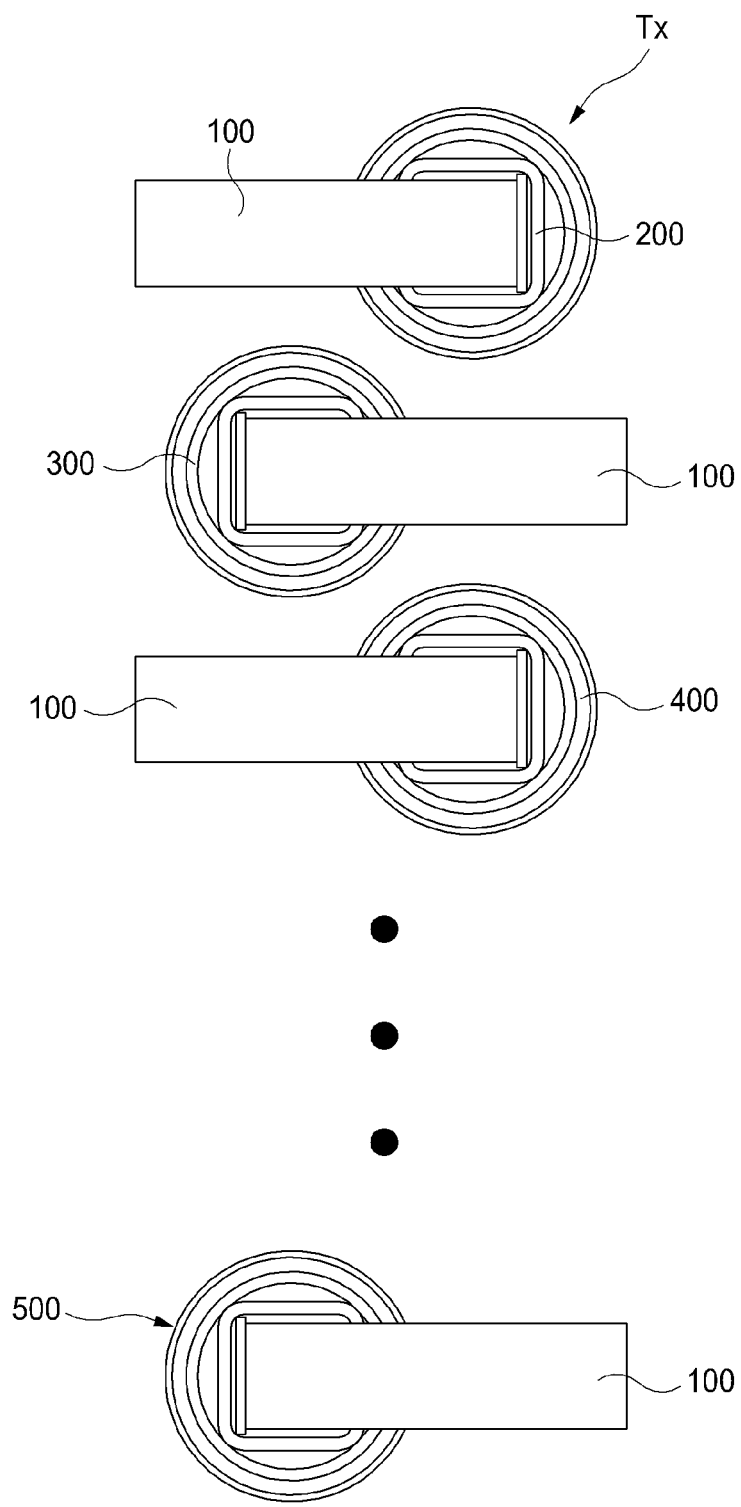
FIG. 8 is a detailed view showing the arrangement of the transformers in FIG. 7.

FIG. 8 is a detailed view showing the arrangement of the transformers in FIG. 7.

In the transformers Tx, Tx1~Tx3 in accordance with the embodiment of the present invention, the first coil unit 300 and the second coil unit 500 may be wound on the one side of the rectangular shaped core 100.

Therefore, only the portion wound by coil may protrude when viewed from the above.

As in the Drawings, the transformers Tx, Tx1~Tx3 are arranged as the portions wound by coil alternatively cross, and then the insulation destruction phenomenon owing the short distance between the second coil units 500 may be prevented. Since greater distance from the second coil unit 500 of the other transformer may be available, free design and arrangement of the transformers may be available.

In addition, in the embodiments, a rectangular shaped core 100 are applied, but a π shaped core, an E shaped core may be used in the condition that the first coil is wound on the insulation body lay between the core and the first coil and the second coil is wound on the bobbin having a partitioning flange in the transformer.

In addition, the plurality of transformers may be available by installing first coil, bobbin having a partitioning flange and second coil at at least two sides of the core may be available.

The high voltage power supply apparatus in accordance with the embodiment of the present invention may have the above described transformer.

Figure 9:
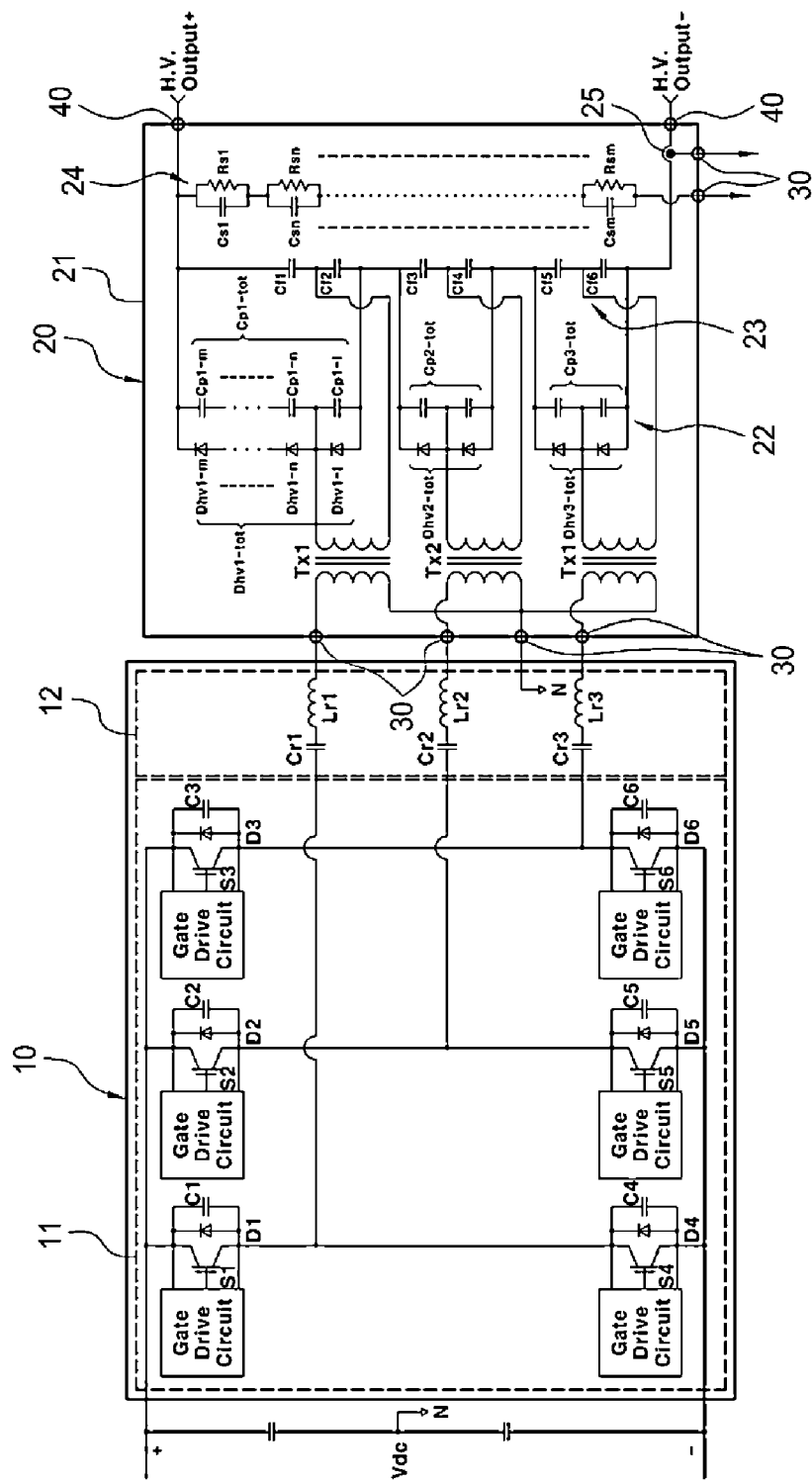
FIG. 9 is a circuit diagram showing the high voltage power supply apparatus in accordance with the embodiment of the present invention.

FIG. 9 is a circuit diagram showing the high voltage power supply apparatus in accordance with the embodiment of the present invention.

The high voltage power supply apparatus in accordance with the embodiment of the present invention may have a resonating converter circuit for converting DC current to DC current of different level.

The high voltage power supply apparatus in accordance with the embodiment of the present invention may include includes an inverter 10 for converting DC voltage Vdc to AC voltage; one or more transformers Tx1~Tx3 for converting first AC voltage converted by the inverter to second AC voltage different from the first AC voltage; and a rectifying unit 22 for rectifying the second AC voltage converted by the one or more transformer to DC voltage, and a filtering unit 23 for filtering the rectified DC voltage and outputting to the out port.

Here, the inverter 10 may include a switching unit 11 for converting DC voltage Vdc to AC voltage, and a resonating circuit unit 12 for converting the frequency characteristic of the AC voltage transferred from the switching unit 11 by using resonating phenomenon. The switching unit 11 may include a plurality of switching devices S1~S6, inverse parallel diodes D1~D6 connected with the respective switching devices S1~S6 and snubber capacitors C1~C6 in parallel, and Gate Drive Circuit for switching operation of the switching devices S1~S6.

The switching devices S1~S6 in the switching unit 11 may use semiconductor switch for power supply such as IGBT, MOSFET, BJT, and any other semiconductor switch which has on/off control.

In the switching unit 11, the switching devices S1~S6 may be connected in Half Bridge structure or Full Bridge structure, and may include on or more Switching Legs in order to provide output of single phase or multiple phases.

In FIG. 9, a 3 phase Half Bridge resonating type inverter 10 having three switching leg as one single phase switching leg of a pair of switching devices S1~S6 in Half Bridge structure are exampled.

The resonating circuit unit 12 may include resonating inductors Lr1~Lr3 and resonating capacitors Cr1~Cr3, and the resonating inductors Lr1~Lr3 and the resonating capacitors Cr1~Cr3 may be serially connected with the first coil at the connection node of the two switching devices S1~S6 forming the respective phase switching legs.

Next, the high voltage power supply apparatus in accordance with the embodiment of the present invention may have a plurality of transformer Tx1~Tx3 for converting AC voltage of each phase output of the inverter, i.e. each phase transferred from the switching leg to AC voltage of different level.

In case of an inverter having output of single phase, i.e. an inverter having output of single phase regardless of the structure of the switching unit 11 such as Half Bridge structure and Full Bridge structure, one transformer may be used.

As the transformer Tx1~Tx3 in the high voltage power supply apparatus in accordance with the embodiment of the present invention, the transformer shown in FIGS. 1 to 6 may be used. Since the high voltage power supply apparatus in accordance with the embodiment of the present invention is a power supply apparatus for applying a high voltage at the output terminal connected with the load, the respective transformers Tx1~Tx3 may be a raising transformer for raising the output of each phase of the inverter according to the ratio of the turns of the first coil unit and the second coil unit.

In addition, the rectifying unit 22 may include a plurality of rectifying diodes Dhv1-tot, Dhv2-tot, Dhv3-tot for rectifying AC voltage induced in the second coil unit to DC voltage, and the filtering unit 23 may include capacitors Cf1~Cf6 serially connected with the rectifying unit 22 in order to provide stable voltage to the load by filtering the output power of the rectifying unit 22.

In FIG. 9, the reference numeral 24 indicates a voltage sensing unit for sensing the output voltage by being connected with the rectifying unit 22, and the reference numeral 25 indicates a current sensing unit for sensing the output current by being installed in the output terminal of the rectifying unit 22.

The components such as the transformers Tx1~Tx3 for raising the AC voltage of the inverter 10, the rectifying unit 22 for rectifying the AC voltage, the filtering unit 23 for filtering the output of the rectifying unit 22, and the high voltage unit 20 having the voltage sensing unit 24 and the current sensing unit 25 for sensing voltage and current at the output terminal, may be installed in the separate manufactured case 21, and in particular the components such as the high voltage unit 20 may be maintained in the insulation state by being impregnated in the insulating material filled in the case 21 such as insulation oil.

The first coil unit of the transformers Tx1~Tx3 should be connected with the inverter 10 outside of the case 21, and the output terminal for applying high voltage to load connected with the rectifying unit 22 also needs to be connected with the outside via a high voltage cable, etc.

Together with this, the voltage sensing unit 24 and the current sensing unit 25 also need to be connected with the outside for outputting signal of the voltage sensing unit 24 and the current sensing unit 25.

But, in the inside of the case installed with the transformers Tx1~Tx3, the rectifying unit 22, the voltage sensing unit 24 and the current sensing unit 25, since the insulating material such as insulating oil is filled in the case 21, the connectors 30, 40 for connecting the respective components with the outside cable should be designed in consideration of the insulation from the case 21 and leak prevention of the insulating material.

Figure 10:
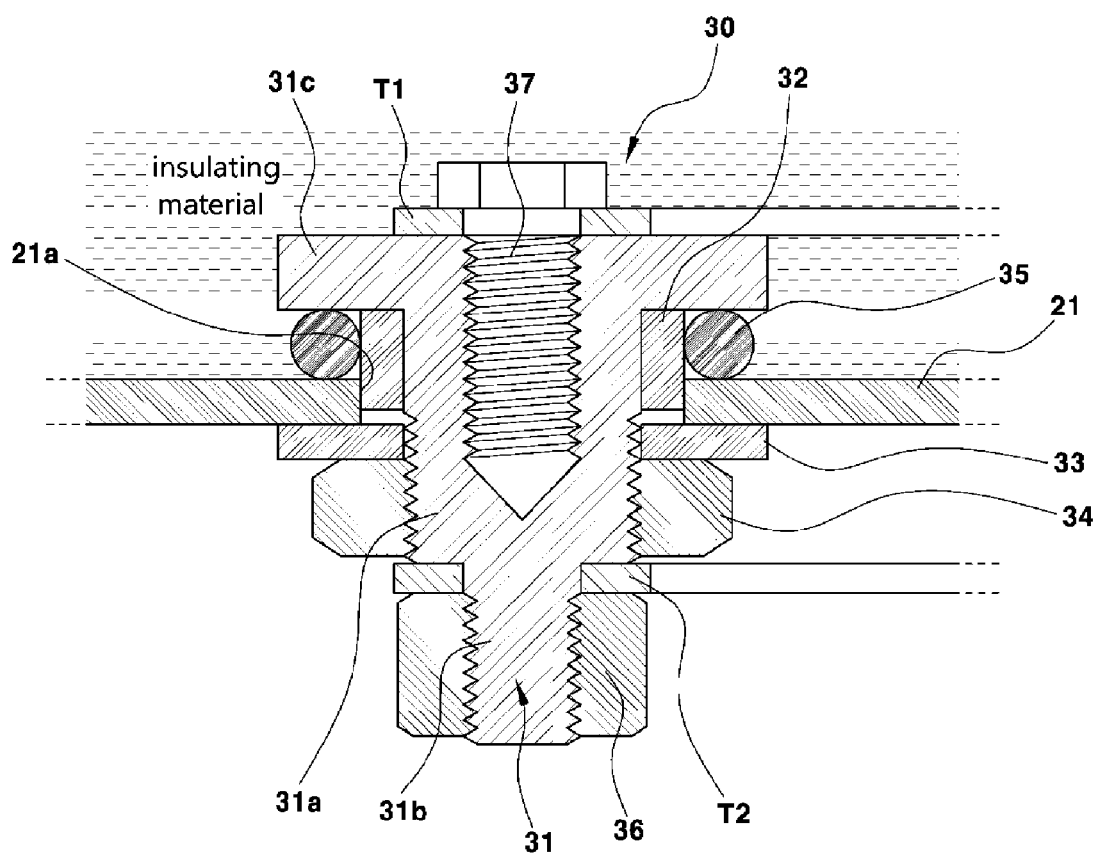
FIG. 10 is a sectional view showing a connector for low voltage and high current applicable to the high voltage power supply apparatus in accordance with the embodiment of the present invention.
Figure 11:
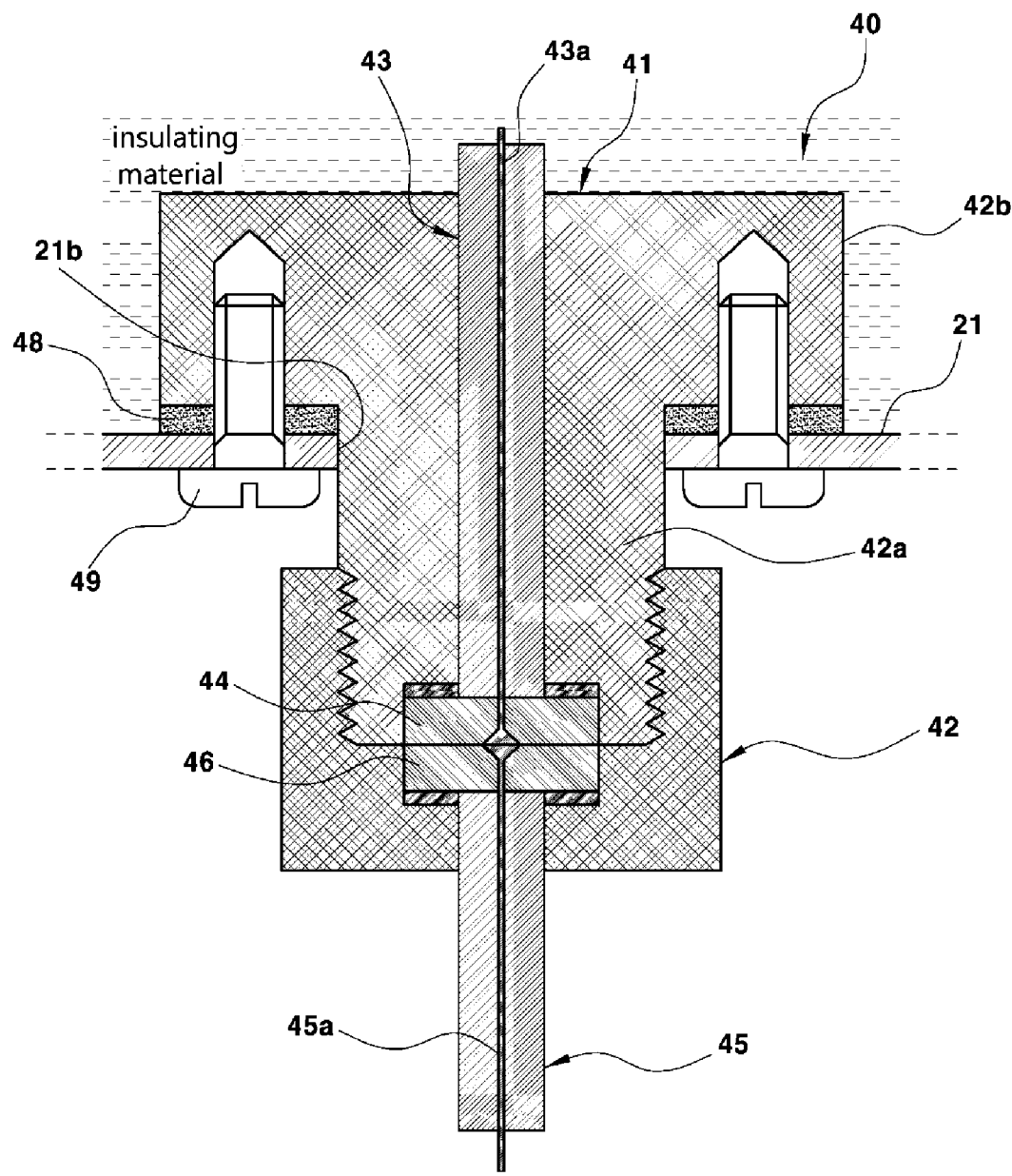
FIG. 11 is a sectional view showing a connector for high voltage and low current applicable to the high voltage power supply apparatus in accordance with the embodiment of the present invention.

For this, new connectors for connecting the respective components with the outside applicable to the high voltage unit 20 are provided with, and FIG. 10 is a sectional view showing a connector 30 for low voltage and high current applicable to the high voltage power supply apparatus in accordance with the embodiment of the present invention, and FIG. 11 is a sectional view showing a connector for high voltage and low current.

The connector 30 for low voltage and high current in FIG. 10, may be used for outside connection for the first coil unit, the voltage sensing unit 24 and the current sensing unit 25 of the transformers Tx1~Tx3, and may be formed with a mounting hole 21a for mounting the connector for outside connection to the case 21, and the connector 30 is mounted to the mounting hole 21a.

Hereinafter the connector 30 for low voltage and high current in FIG. 10 is called as the first connector.

The first connector 30 may include, a conductive member 31 for connecting the terminals respectively formed in the inner coil and the outer coil inside and outside of the case 21, the conductive member 31 inserted through a mounting hole 21a formed in the case 21; a first insulation member 32 installed between the case 21 and the conductive member 31, the first insulation member 32 insulating the case 21 from the conductive member 31; a fixing member 34 for fixing the conductive member 31 to the mounting hole 21a of the case 21; a insulation sealing member 35 installed between the case 21 and the conductive member 31, the sealing member 35 sealing the gap between the case 21 and the conductive member 31; a first connecting member 36 for fixing the terminal T2 outside of the case 21 to the conductive member 31; and a second connecting member 37 for fixing the terminal T1 inside of the case 21 to the conductive member 37.

The conductive member 31 may be made of conductive material such as copper Cu, and have size and length insertable to the mounting hole 21a of the case 21.

In the preferred embodiment, as shown in FIG. 10, the conductive member 31 include a body unit 31a, 31b inserted through the mounting hole 21a of the case 21, the body unit 31a, 31b having a circular section and a certain length and being positioned through the inside and the outside of the case 21, and a hooking portion 31c having a flange shape in one end of the body unit 31a, 31b.

The body unit may include a large diameter portion 31a inserted through the mounting hole 21a of the case 21, and a small diameter portion 31b connected with the terminal for outer connection outside of the case 21.

The first insulation member 32 may be preferably made of Glass Fiber, etc., and a cylindrical shape of Glass Fiber in order to be inserted between the inner circumferential surface of the mounting hole 21a of the case 21 and the outer circumferential surface of the conductive member 31.

The insulation state may be maintained by the first insulation member 32 inserted between the case 21 and the conductive member 31 because the first insulation member 32 is inserted into the mounting hole 21a of the case 21 in a state of being inserted to the outer circumferential surface of body unit (large diameter portion 31a).

The fixing member 34 for fixing the body unit 31a, 31b of the conductive member 31 to the mounting hole 21a of the case 21 and preventing the body unit 31a, 31b of the conductive member 31 coming out from the mounting hole 21a of the case 21 may be connected with the body unit (large diameter portion 31a) opposite to the hooking portion 31c based on the mounting hole 21a of the case 21 in the conductive member 31.

The body unit 31a is fixed to the case 21 at the outside of the case 21, and then the conductive member 31 is fixed to the case 21.

The fixing member 34 may have a nut shape, and be screw-connected to the outer circumferential surface of the body unit, in more detail the large diameter portion 31a positioned outside of the case 21 in the conductive member 21.

When the fixing member 34 of the nut shape is screw-coupled to the outer circumferential surface of the large diameter portion 31a of the conductive member 31, since the hooking member 31c of the conductive member 31 pressurizes and is hooked with the inner surface of the case 21 in a state that the sealing member 35 is inserted between the hooking member 31c and the case 21, and the fixing member 34 of the nut shape pressurizes the outer surface of the case 21 in a state that the second insulating member 33 is inserted between the fixing member 34 and the case 21, the conductive member 31 may be firmly fixed to the mounting hole 21a of the case 21.

Here, the sealing member 35, as an O-ring shape made of insulating material, is inserted between the hooking member 31c of the conductive member 31 and the inner surface of the case 21 at the outside (outer circumferential direction) of the first insulating member 32, and in this state leak of the insulating material through the gap between the body unit 31a of the conductive member 31 and the case 21 may be prevented.

In addition, in the preferred embodiment, the second insulating member 33 is inserted between the fixing member 34 of the nut shape and the outer surface of the case 21, and the second insulating member 33 may have a ring shape made of insulating material such as glass fiber.

Since the second insulating member 33 is inserted between the fixing member 34 of the nut shape and the body unit 31a of the conductive member 31, and the fixing member 34 of the nut shape and the body unit 31a of the conductive member 31 are screw-coupled with each other, the second insulating member 33 is maintained in the state of being inserted between the fixing member 34 and the outer surface of the case 21 after screw-coupling, and insulation state of the conductive member 31 and the fixing member 34 from the outer surface of the case 21 may be maintained although the fixing member 34 is screw-coupled.

The first connecting member 36 is means for connecting the outer terminal T2 of the case 21, i.e. the terminal fixed to the end of the coil connected with the first coil unit of the transformer to the conductive member 31 from the switching leg, and may have a nut shape for being screw-coupled to the outer circumferential surface of the small diameter portion 31b of the conductive member 31.

Here, the terminal T2 has a ring shape portion, and the first connecting member 36 of the nut shape is screw-coupled with the body unit of the conductive member 31, i.e. the surface of the small diameter portion 31b after the ring shape portion is inserted between the outer circumferential surface of the small diameter portion 31b of the conductive member 31.

The electrical connection with the conductive member 31 is maintained in a state that the outer terminal T2 of the case is pressurized and inserted between the large diameter portion 31a of the conductive member 31 and the first connection member 36.

In addition, the connecting member 37 is means for connecting the inner terminal T1 of the case 21, i.e. the terminals respectively fixed to the end of the first coil unit of the transformer Tx1~Tx3 and the end of the output conductor wires of the voltage sensing unit 24 and the current sensing unit 25 to the conductive member 31, and may be a nut shaped member being inserted and coupled within the conductive member 31 from the inside of the case 21.

The terminal T2 within the case 21 also has a ring shape portion, and the second connecting member 37 of the bolt shape is inserted into the screw hole formed in a longitudinal direction of the conductive member 31 after the ring shape portion is inserted to the outer circumferential surface of the second connecting member 37.

The electrical connection with the conductive member 31 is maintained in a state that the inner terminal T2 of the case 21 is pressurized and inserted between the conductive member 31 and the head unit of the second connection member 37.

The first connector 30 may include the conductive member 31, the first insulating member 32, the fixing member 35, the first connecting member 36 and the second connecting member 37, may be used for connection of the inductor 10 and the first coil units of the transformers Tx1~Tx3, and the first connector of smaller size may be used for connections of the voltage sensing unit 24 and the current sensing unit 25.

As shown in FIG. 9, four first connectors 30 may be used for connection of three switching legs, first coil units of three transformers Tx1~Tx3 in case of the resonating inverter 10 having three phase, and the number of the first connectors 30 may be varied according to the number of the switching legs of the resonating inverter of single phase or multiple phases and the transformers within the case 21.

Referring to FIG. 9, one of two coils outside of the case 21 connected with the first coil unit of the transformers Tx1~Tx3 in the respective switching legs of the inverter 10 is connected with the one end of the first coil unit of the transformers Tx1~Tx3, and here the other end of the first coil unit of the transformers Tx1~Tx3 is connected with the other of the two coils outside of the case 21 in a state of common connection.

Four first connectors 30 may be used for connection between the inverter 10 and the transformers Tx1~Tx3 when three switching legs and three transformers Tx1~Tx3 are applied, and in the outer connection portion of the voltage sensing unit 24 and the current sensing unit 25 may be respectively used respective one connectors 30.

Next, the connector 40 for high voltage and low current may be used for outer connection at the output terminal of the high voltage power supply apparatus, and may be used for connecting the cable 43 of the output terminal connected with the rectifying unit 22 in the high voltage power supply apparatus.

Hereinafter, the connector 40 for high voltage and low current in FIG. 11 is called as the second connector, and the second connector 40 is also mounted to the mounting hole 21b formed in the case 21.

As shown in FIG. 11, the second connector 40 may include a connector body 41 having a flange unit 42b fixed to the case 21 and a connecting unit 42a inserted through a mounting hole 21b formed at the case 21; a first conductive unit 44 connected with the end of the inner cable 43 being inserted through and penetrating the flange unit 42b and the connecting unit 42a of the connector body 41 to the inside of the flange unit 42b and the connecting unit 42a; a connector cap 42 coupled with the connecting unit 42a of the connector body 41 at the outside of the case 21; and a second conductive unit 46 connected with the end of the outer cable 45 being inserted through and penetrating the connector cap 42 to the inside of the connector cap 42.

The connector body 41 may include the flange unit 42b fixed to the inner surface of the case 21 by connecting means such as a screw 49, and the connecting unit 42a inserted through a mounting hole 21b of the case 21, and the flange unit 42b and the connecting unit 42a may be integrally formed by using insulating materials such Teflon, and then the sectional shape of the longitudinal end of the connector body 41 having 'T' shape may be manufactured.

Sealing between the flange unit 42b and the inner surface of the case 21 which are coupled with each other by screw, etc. in the connector body 41 is necessary in order to prevent the insulating material such as insulating oil from being leaked, and a sealing member 48 of O-ring shape made of rubber, etc., is inserted between the flange unit 42b and the inner surface of the case 21.

The connector cap 42 has a cap shaped member formed with female screw in the inner circumferential surface, and is screw-coupled with the outer circumferential surface of the connecting unit 42a inserted through the mounting hole 21b to the outside of the case 21

The connector cap 42 may also be made of insulating materials such Teflon.

The first conductive unit 44 and the second conductive unit 46 are portions for electrical connection between the inner cable 43 and the outer cable 45, the first conductive unit 44 is installed at the end of the inner cable 43 connected with the rectifying unit 22 and the second conductive unit 46 is installed at the end of the outer cable 45 for transferring the output of the high voltage power supply apparatus to the outside of the case 21.

The first conductive unit 44 and the second conductive unit 46 may be made of conductive material such as copper Cu, and have a plate shape, the first conductive unit 44 may be assembled by being inserted into the end groove of the connecting unit 42a of the connector body 41, and the second conductive unit 46 may be assembled by being inserted into the inner surface groove of the connector cap 42 of the connector body 41.

When the connector cap 42 is screw-coupled with the connecting unit 42a of the connector body 41, the first conductive unit 44 and the second conductive unit 46 are electrically connected in pressurized and connected state, and the electrical connection between the inner cable 43 and the outer cable 45.

The inner cable 43 and the outer cable 45 may be a high voltage insulation covered cable, the first conductive unit 44 and the second conductive unit 46 are respectively connected with the respective core wire 43a, 45a of the respective cable, and the electrical connection of the inner cable 43 and the outer cable 45 is made by the connection of the two conductive units.

Hereinafter, the efficient arrangement structure of the elements of the high voltage unit considering the insulation and the electrical power density is explained as follows.

Referring to FIG. 7, the elements of the high power unit 20 are arranged in the case in the impregnated state within the insulation material, and the first connector 30 and the second connector 40 for outer electrical connection installed in the case 21 are shown.

In the high voltage unit 20, the second coil unit of the respective transformers Tx1~Tx3 within the case 21 are serially connected, and the first coil unit 300 of the respective transformers Tx1~Tx3 is connected with the rectifying unit 22 via the second connector 30.

In the embodiments as shown in the Drawings, three transformers Tx1~Tx3 are installed within the case 21, and the number of the transformers may be varied according to the structure of the inverter.

In addition, referring to FIGS. 7 and 8, the transformers Tx, Tx1~Tx3 are arranged as the first coil units 300 and second coil units 500 alternatively cross with each other.

The portions wound by the first coil unit 300 and the second coil unit 500 together with each other are alternatively arranged so that the adjacent transformers Tx, Tx1~Tx3 does not overlap with each other.

Since this arrangement of the transformers Tx, Tx1~Tx3 in which the portion of the rectangular shaped core 100 wound by coils 301, 501 is positioned opposite to the other one of the transformers Tx1~Tx3, a sufficient insulation distance d between the coils of the adjacent transformers Tx1~Tx3 may be available.

Therefore, the apparatus having a plurality of transformers Tx1~Tx3 may have a smaller overall volume and size, and a more compact structure for the high voltage unit 20 of the power supply unit may be available.

Since only the portion wound by coil may protrude by being wound by the first coil unit 300 and the second coil unit 500 only at one side of the rectangular shaped core 100 in the transformers Tx, Tx1~Tx3, if the transformers Tx, Tx1~Tx3 are arranged so that the portions wound by coil alternatively cross with each other, a sufficient insulation distance between the first coil units 300 of the adjacent transformers Tx1~Tx3 may be available, so the insulation destruction therebetween may be prevented.

Figure 12:
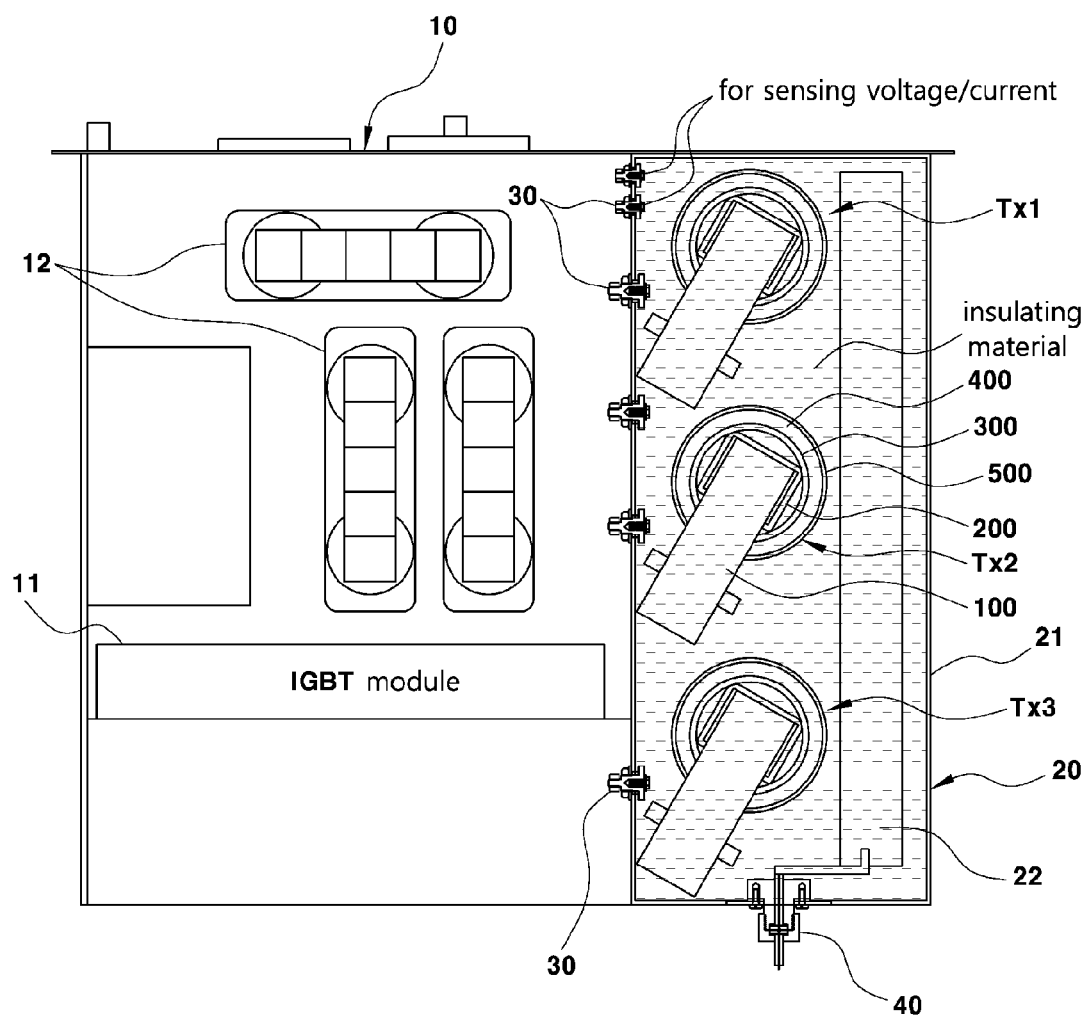
FIGS. 12 and 13 are plane views for showing the arrangement of the transformers the high voltage power supply apparatus in accordance with the embodiment of the present invention.
Figure 13:
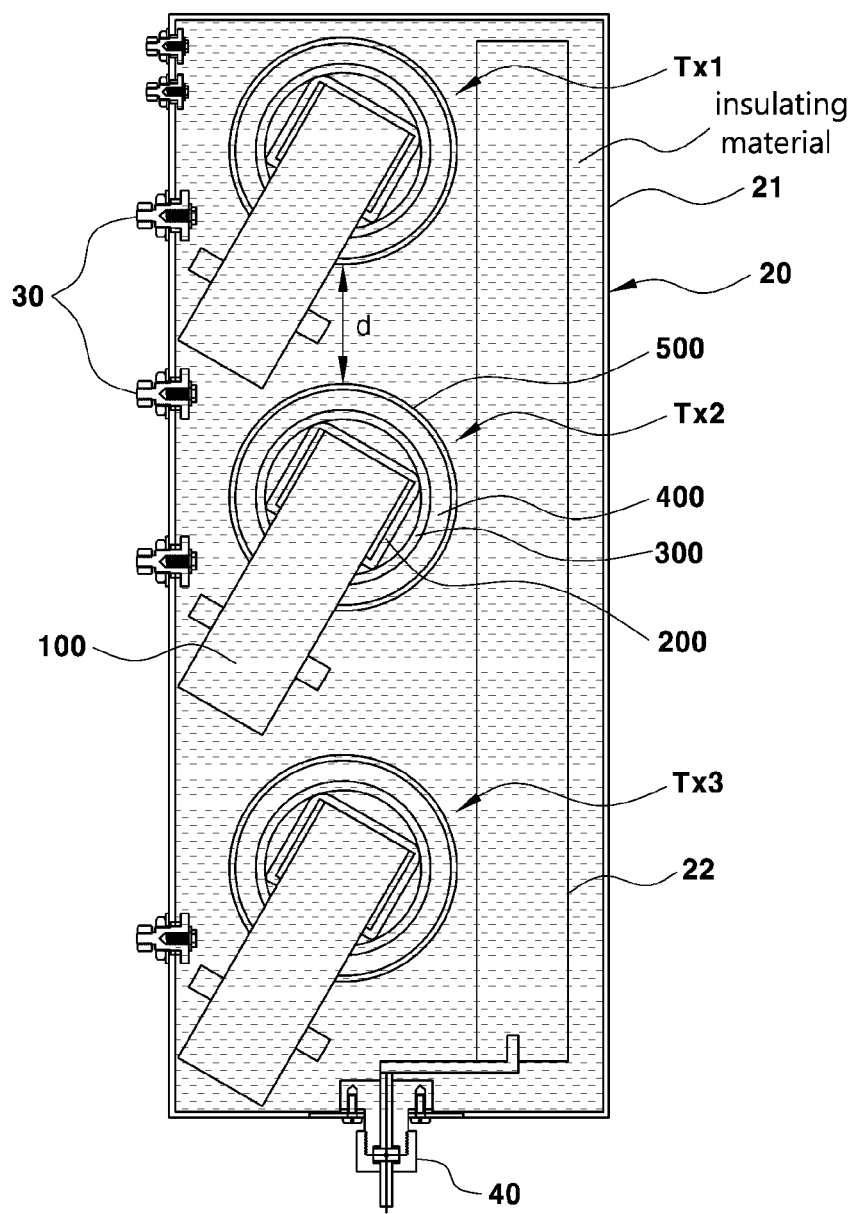
Figure 14:
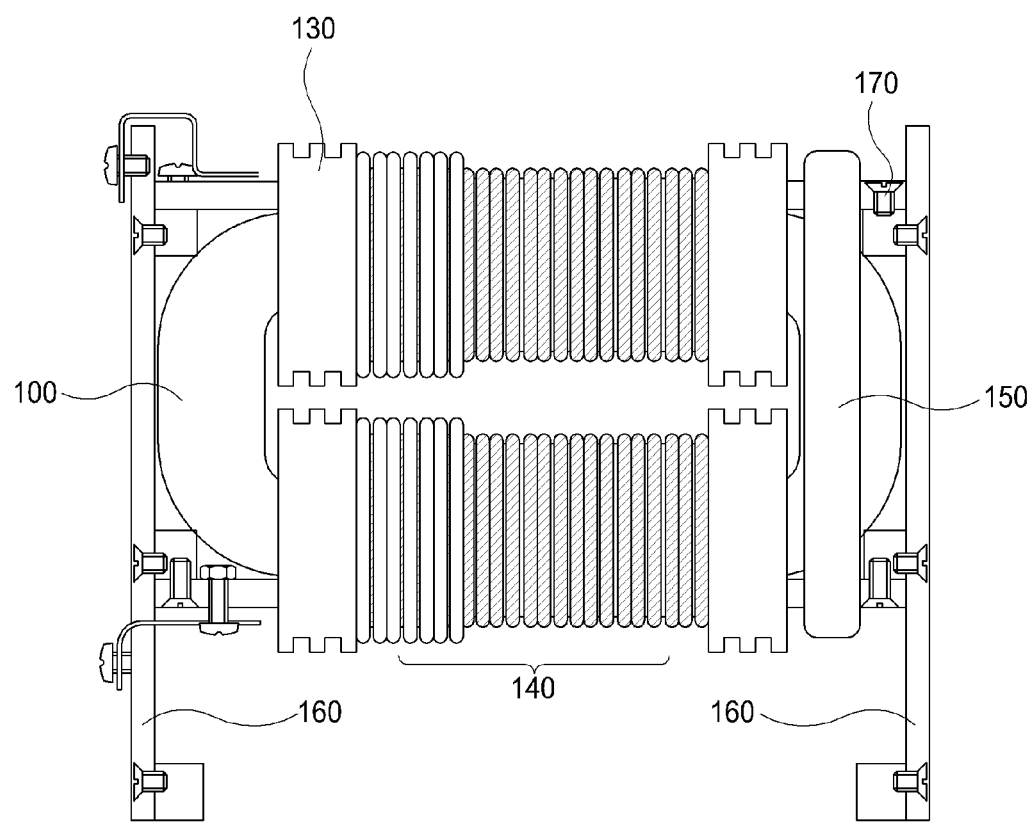
FIG. 14 shows a structure of the prior transformer.
Figure 15:
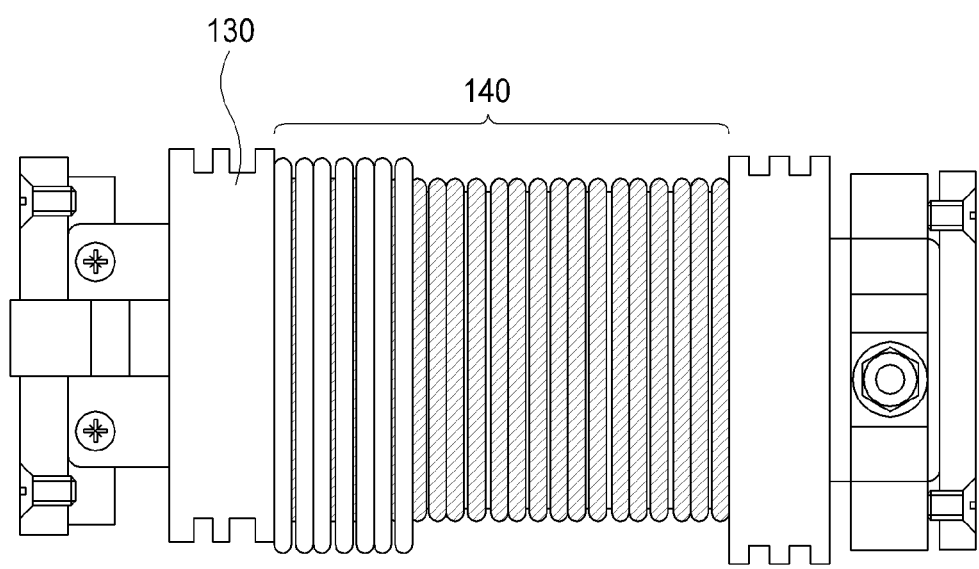
FIG. 15 is a side view of the prior transformer of FIG. 14.

FIGS. 12 and 13 are plane views for showing the arrangement of the transformers the high voltage power supply apparatus in accordance with the embodiment of the present invention.

When the first coil unit 300 and the second coil unit 500 are wound in one side of the rectangular shaped core 100 and arranged in the direction slanted with the arranging direction of the cores 100, enough insulation distance from the adjacent transformers Tx1~Tx3.

Herein, the sides wound by the coil units 300, 500 in the transformers Tx1~Tx3 are arranged in the arranging direction of the cores 100 based on the core 100 so as that the respective positions of the sides wound by the coil units 300, 500 are arranged in the arranging direction of the cores 100. And when the first coil unit 300 and the second coil unit 500 are wound in one side of the rectangular shaped core 100 and arranged in the direction slanted with the arranging direction of the cores 100, enough insulation distance and compact structure may be available.

While the present invention has been shown and described in connection with the exemplary embodiments, it will be apparent to those skilled in the art that modifications and variations can be made without departing from the spirit and scope of the invention as defined by the appended claims.

What is claimed is:

1. A transformer comprising: first coil unit and second unit,
wherein one or more coils are wound on the bobbin of insulating material in at least one of the first coil unit and the second unit, and
wherein the bobbin is formed with at least one partitioning flange for partitioning a coil winding surface of the bobbin into two winding surfaces along the longitudinal direction of the bobbin,
wherein the bobbin is formed with at least one first partitioning flange formed with an opening around the winding surface through which a coil is inserted in the longitudinal direction of the bobbin, and at least two second partitioning flanges not having any opening through which a coil is inserted in the longitudinal direction of the bobbin, the first partitioning flange and the second partitioning flange being arranged in alternating order,
wherein the bobbin is formed with at least one first winding surface and at least one second winding surface that is partitioned by the at least one first partitioning flange with the opening and adjacent partitioning flanges of the at least two second partitioning flanges not having any opening,
wherein the coil includes at least one subcoil which is inserted through the opening of the first partitioning flange, both sides of the subcoil inserted in the opening of the first partitioning flange are respectively wound in at least one layer on the first winding surface and the second winding surface divided by the first partitioning flange, and the both ends of the at least one subcoil are respectively positioned over adjacent second partitioning flanges and electrically connected with the adjacent subcoils over the second partitioning flanges.

2. The transformer of claim 1, wherein the wound subcoil is lower than the outer ends of the first and the second partitioning flanges.

3. The transformer of claim 1, comprising a core wound by the first coil unit and the second coil unit.

4. The transformer of claim 3, wherein the core has a rectangular ring shape, and the first coil unit is wound on one side of the rectangular ring shaped core.

5. The transformer of claim 1, wherein the bobbin encloses the first coil unit, and the second coil unit is wound on the bobbin.

6. The transformer of claim 1, wherein the first coil unit is wound in a cylinder shape without a core in which magnetic flux flows.

7. A high voltage power supply apparatus comprising:
an inverter for converting DC voltage to AC voltage;
one or more transformer for converting first AC voltage converted by the inverter to second AC voltage different from the first AC voltage; and
a rectifying unit for rectifying the second AC voltage converted by the one or more transformer to DC voltage,
wherein the one or more transformer comprises: first coil unit and second unit, wherein one or more coils are wound on the bobbin of insulating material in at least one of the first coil unit and the second unit, and wherein the bobbin is formed with at least one partitioning flange for partitioning a coil winding surface of the bobbin into two winding surfaces along the longitudinal direction of the bobbin, wherein the bobbin is formed with at least one first partitioning flange formed with an opening around the winding surface through which a coil is inserted in the longitudinal direction of the bobbin, and at least two second partitioning flanges not having any opening through which a coil is inserted in the longitudinal direction of the bobbin, the first partitioning flange and the second partitioning flange being arranged in alternating order, wherein the bobbin is formed with at least one first winding surface and at least one second winding surface that is partitioned by the at least one first partitioning flange with the opening and adjacent partitioning flanges of the at least two second partitioning flanges not having any opening, wherein the coil includes at least one subcoil which is inserted through the opening of the first partitioning flange, both sides of the subcoil inserted in the opening of the first partitioning flange are respectively wound in at least one layer on the first winding surface and the second winding surface divided by the first partitioning flange, and the both ends of the at least one subcoil are respectively positioned over adjacent second partitioning flanges and electrically connected with the adjacent subcoils over the second partitioning flanges.

8. The high voltage power supply apparatus of claim 7, wherein a plurality of the transformers respectively have a rectangular ring shaped core, the bobbin encloses the first coil unit, and the second coil unit is wound on the bobbin, the plurality of the transformers are arranged in parallel with each other in a direction perpendicular with the ring of the core, and the side in the rectangular ring wound by the first coil unit in one transformer is opposite to the side in the rectangular ring wound by the first coil unit in the adjacent transformer.

9. The high voltage power supply apparatus of claim 7, wherein a plurality of the transformers respectively have a rectangular ring shaped core, the bobbin encloses the first coil unit, and the second coil unit is wound on the bobbin, the plurality of the transformers are arranged in parallel with each other in a direction perpendicular with the ring of the core, and the cores of the plurality of the transformers are slanted with the arranging direction of the cores.

10. The high voltage power supply apparatus of claim 7, wherein the wound subcoil is lower than the outer ends of the first and the second partitioning flanges.

11. The high voltage power supply apparatus of claim 7, comprising a core wound by the first coil unit and the second coil unit.

12. The high voltage power supply apparatus of claim 7, wherein the bobbin encloses the first coil unit, and the second coil unit is wound on the bobbin.

13. The high voltage power supply apparatus of claim 7, wherein the first coil unit is wound in a cylinder shape without a core in which magnetic flux flows.

* * * * *